US010079029B2

United States Patent
Amini et al.

(10) Patent No.: US 10,079,029 B2
(45) Date of Patent: *Sep. 18, 2018

(54) GENERATING COMMUNICATIVE BEHAVIORS FOR ANTHROPOMORPHIC VIRTUAL AGENTS BASED ON USER'S AFFECT

(71) Applicant: IPsoft Incorporated, New York, NY (US)

(72) Inventors: Reza Amini, Secaucus, NJ (US); Ugan Yasavur, Jersey City, NJ (US); Jorge Travieso, New York, NY (US); Chetan Dube, New York, NY (US)

(73) Assignee: IPSOFT INCORPORATED, New York ( * ) Notice: Subject to any disclaimer, the term of this patent is extended or adjusted under 35 U.S.C. 154(b) by 0 days.

This patent is subject to a terminal disclaimer.

(21) Appl. No.: 15/718,170

(22) Filed: Sep. 28, 2017

(65) Prior Publication Data
US 2018/0144761 A1    May 24, 2018

Related U.S. Application Data

(63) Continuation of application No. 15/440,589, filed on Feb. 23, 2017, now Pat. No. 9,812,151.
(Continued)

(51) Int. Cl.
*G10L 21/00* (2013.01)
*G10L 25/00* (2013.01)
(Continued)

(52) U.S. Cl.
CPC ......... *G10L 21/10* (2013.01); *G06K 9/00302* (2013.01); *G06T 13/40* (2013.01); *G10L 15/265* (2013.01); *G10L 25/63* (2013.01)

(58) Field of Classification Search
CPC . G10L 13/00; G10L 13/033; G10L 2021/105; G10L 13/02; G10L 15/25; G06T 13/40; G06T 13/205; G06T 13/00; G06T 2213/02; G06N 3/006; G06F 3/011; G06F 8/30
(Continued)

(56) References Cited

U.S. PATENT DOCUMENTS 5,559,927 A *  9/1996  Clynes .................. G10L 13/033
                                                       704/258
5,987,415 A * 11/1999  Breese .................... G10L 17/26
                                                       704/270
(Continued)

OTHER PUBLICATIONS

Kasap et al, "Making Them Remember—Emotional Virtual Characters with Memory," 2009, in IEEE Computer Graphics and Applications, vol. 29, No. 2, pp. 20-29, Mar.-Apr. 2009.*
(Continued)

*Primary Examiner* — Olujimi Adesanya
(74) *Attorney, Agent, or Firm* — Pearl Cohen Zedek Latzer Baratz LLP

(57) ABSTRACT

Systems and methods for automatically generating at least one of facial expressions, body gestures, vocal expressions, or verbal expressions for a virtual agent based on emotion, mood and/or personality of a user and/or the virtual agent are provided. Systems and method for determining a user's emotion, mood and/or personality are also provided.

17 Claims, 11 Drawing Sheets

Related U.S. Application Data

(60) Provisional application No. 62/423,881, filed on Nov. 18, 2016, provisional application No. 62/423,880, filed on Nov. 18, 2016.

(51) Int. Cl.

| | | |
|---|---|---|
| *G10L 13/08* | (2013.01) | |
| *G10L 21/10* | (2013.01) | |
| *G10L 15/26* | (2006.01) | |
| *G06K 9/00* | (2006.01) | |
| *G06T 13/40* | (2011.01) | |
| *G10L 25/63* | (2013.01) | |

(58) Field of Classification Search
USPC .................................................. 704/270–275
See application file for complete search history.

(56) References Cited

U.S. PATENT DOCUMENTS

| | | | | |
|---|---|---|---|---|
| 7,457,752 | B2* | 11/2008 | Oudeyer | G10L 13/033 |
| | | | | 700/1 |
| 8,149,241 | B2* | 4/2012 | Do | A63F 13/12 |
| | | | | 345/419 |
| 2009/0055190 | A1* | 2/2009 | Filev | B60W 50/10 |
| | | | | 704/270 |
| 2009/0063154 | A1* | 3/2009 | Gusikhin | B60W 50/10 |
| | | | | 704/260 |
| 2017/0206095 | A1* | 7/2017 | Gibbs | G06F 3/167 |
| 2017/0206694 | A1* | 7/2017 | Jiao | G06T 13/40 |

OTHER PUBLICATIONS

Amini, R.: "Learning data-driven models of non-verbal behaviors for building rapport using an intelligent virtual agent" Mar. 2015, Ph.D. thesis, Florida International University (2015), pp. 1-268.*

Strauss, "Realtime generation of multimodal affective sports commentary for embodied agents", 2007, Master's thesis, Saarland University, 2007, pp. 1-128.*

Han et al, "Robotic Emotional Expression Generation Based on Mood Transition and Personality Model," 2013, in IEEE Transactions on Cybernetics, vol. 43, No. 4, pp. 1290-1303, Aug. 2013.* da Silva et al, "Affective Agents for Empathic Interactions", 2011, In: Anacleto J.C., Fels S., Graham N., Kapralos B., Saif El-Nasr M., Stanley K. (eds) Entertainment Computing—ICEC 2011. ICEC 2011. Lecture Notes in Computer Science, vol. 6972. Springer, Berlin, Heidelberg.*

* cited by examiner

GENERATING COMMUNICATIVE BEHAVIORS FOR ANTHROPOMORPHIC VIRTUAL AGENTS BASED ON USER'S AFFECT

CROSS REFERENCE TO RELATED APPLICATIONS

This application is a continuation of U.S. patent application Ser. No. 15/440,589, filed on Feb. 23, 2017, which claims priority of and benefit to U.S. provisional patent application No. 62/423,880, filed on Nov. 18, 2016, and U.S. provisional patent application No. 62/423,881 filed on Nov. 18, 2016, the entire contents of which are all incorporated herein by reference in their entireties.

FIELD OF THE INVENTION

The invention relates generally to behavior models for a virtual agent. In particular, the invention relates to methods for determining a behavior (e.g., verbal and/or non-verbal) for a virtual agent based on emotion, mood, and/or personality of a user and/or the virtual agent during a dialogue with the user.

BACKGROUND OF THE INVENTION

Current cognitive computing systems can include a virtual agent. The virtual agent can appear to a user on a display, for example, such that a life like human image (e.g., a 3D animation of a human) and/or an avatar is displayed to the user. Virtual agents can be displayed to a user on a display of a computing device (e.g., computer, tablet, smart phone, etc.,) and can talk to the user via an audio output of the computing device. Typically, if the virtual agent outputs utterances to the user, the virtual agent can appear to the user as if it is talking (e.g., lips are moving, face is moving) and corresponding behavior (e.g., facial expressions, body gesture and/or voice fluctuations) can be displayed/output.

In current systems that include virtual agents displayed to a user, the behavior of the virtual agent is typically pre-assigned to the virtual agent's utterances. For example, for a virtual agent that utters "how may I help you", a smiling behavior may be assigned to that utterance. The behavior is typically specified in accordance with standard Behavior Markup Language (BML).

One difficulty with assigning behaviors to utterances is that the same utterance can mean different things to a user depending upon the context of the conversation.

Another difficulty with assigning behavior to utterances is that the behavior may be inappropriate for the context of the conversation. For example, at the start of a dialogue the virtual agent may with a smiling face utter to a user "how may I help you?" However, if during the dialogue the user expresses dissatisfaction, current virtual agents typically still utter "how may I help you?" with a smiling face, when a more serious, less smiling expression is likely more appropriate.

Another difficulty with current systems and methods for non-verbal output of a virtual agent is that if the virtual agent outputs an utterance to a user that does not have corresponding behavior specified, the virtual agent's behavior may not match the utterance.

Another difficulty with current systems is that they typically determine content of the user's utterance based solely on the words in the utterance. For example, a user may utter "everything is just perfect." Analysis of the content of this statement based on the words can result in a conclusion that the user is happy. However, if the user's tone and facial expression indicate sarcasm, or if the state of the conversation shows a failure in managing the conversation or a different emotional or satisfaction state for the user, the user can actually mean the exact opposite of the content of the words they are uttering. Thus, current methods for determining a meaning of the user's utterance can be flawed.

Therefore, it can be desirable for a virtual agent to have behavior that corresponds to a natural language conversation between a user and a virtual agent, and that can change based on content, emotion, mood and/or personality of a user and/or virtual agent during the dialogue.

SUMMARY OF THE INVENTION

Some advantages of the invention can include output of a virtual agent that corresponds to emotion, mood and/or personality of a user and/or a virtual agent during a dialogue (e.g., in real-time). Some advantages of the invention can include generating a BML for a virtual agent during a dialogue with a user. Some advantages of the invention can include better understanding by the virtual agent of user utterances based on affective context (e.g., emotion, mood, personality and/or satisfaction of the user).

In one aspect, the invention involves a method for automatically generating at least one of facial expressions, body gestures, vocal expressions, or verbal expressions for a virtual agent. The method involves determining an emotion vector for the virtual agent based on an emotion vector of a user for a user utterance. The method also involves determining a mood vector for the virtual agent based on the emotion vector for the virtual agent and a mood vector of the user for the user utterance. The method also involves determining a personality vector for the virtual agent based on the mood vector for the virtual agent and a personality vector of the user for the user utterance. The method also involves determining at least one of a facial expression, body gesture, vocal expression, or verbal expression for the virtual agent based on a content of the user utterance and at least one of the emotion vector for the virtual agent, the mood vector for the virtual agent and the personality vector for the virtual agent. The method also involves applying the facial expression, body gesture, vocal expression, verbal expression, or any combination thereof to the virtual agent to produce control of the virtual agent's vocal expression, facial expression or both.

In some embodiments, the emotion vector, mood vector, and the personality vector are expressed as a pleasure, arousal, and dominance model. In some embodiments, applying the facial expression, body gesture, vocal expression, verbal expression or any combination thereof to the virtual agent further comprise outputting by the virtual agent a virtual agent utterance. In some embodiments, applying the facial expression body gesture, vocal expression, verbal expressions, or any combination thereof further comprises generating behavior markup language.

In some embodiments, the method also involves determining one or more utterances for the virtual agent based on the content of the user utterance and at least one of the emotion vector for the virtual agent, the mood vector for the virtual agent and the personality vector for the virtual agent. In some embodiments, determining one or more utterances is further based on a profile of the user. In some embodiments, determining one or more utterances further comprises for each of the one or more utterances, determining each word of the current utterance based on previously recorded interactions.

In some embodiments, determining one or more utterances further comprises for each of the one or more utterances, selecting a single utterance from a group of utterance candidates based on a prediction of the next utterance. In some embodiments, determining an emotion vector for the virtual agent is further based on an emotion vector of the virtual agent for a current utterance of the virtual agent, and an emotion vector for the virtual agent's last utterance.

In some embodiments, determining the emotion vector for the virtual agent further comprises assigning, by the computer, a weight to at least one of i) the emotion vector of the user utterance, ii) the emotion vector of the virtual agent for a current utterance of the virtual agent, and iii) the emotion vector for the virtual agent's last utterance, based on a type of the virtual agent, an administrative user input, or any combination thereof. In some embodiments, determining a mood vector for the virtual agent is further based a mood vector for the virtual agent's last utterance.

In some embodiments, determining a mood vector for the virtual agent further comprises assigning a weight to at least one of i) the emotion vector for the virtual agent, ii) the mood vector of the user for the user utterance, and iii) the mood vector for the virtual agent's last utterance, based on a type of the virtual agent, an administrative user input, or combination thereof.

In some embodiments, determining a personality vector for the virtual agent is further based on a personality vector for the virtual agent's last utterance. In some embodiments, determining a personality vector for the virtual agent further comprises assigning, by the computer, a weight to at least one of i) mood vector for the virtual agent, ii) the personality vector of the user, and iii) the personality vector for the virtual agent's last utterance based on a type of the virtual agent, an administrative user input, or combination thereof.

In some embodiments, determining a facial expression, body gesture, vocal expression, or verbal expression for the virtual agent is further based on content of an utterance of the virtual agent.

In another aspect, the invention involves a method to control output of a virtual agent based on a user's affect. The method involves receiving, by a computer, an utterance of a user. The method also involves determining an emotion vector of the user based a content of the utterance. The method also involves determining a mood vector of the user based on the emotion vector of the user. The method also involves determining a personality vector of the user based on the mood vector of the user. The method also involves applying the emotion vector of the user, mood vector of the user and personality vector of the user to output of the virtual agent.

In some embodiments, the mood vector of the user is further based on a previous mood vector of the user. In some embodiments, the personality vector of the user is further based on a previous personality vector of the user. In some embodiments, receiving a vocal characteristic or a facial expression of the user.

In some embodiments, the two or more inputs further comprises one or more dialogue metrics, the one or more dialogue metrics relative length of dialogue, number of misunderstandings, number of repetitions, and/or number of clarification requests by dialogue manager.

In some embodiments, determining the emotion vector of the user further comprises determining a sentiment score of the utterance by determining a sentiment score for each word in the utterance, the sentiment score based on one or more predefined rules, determining a dialogue performance score based on one or more received dialogue performance metrics, determining a vocal emotion score based on a received vocal characteristic of the user, determining a facial emotion score based on a received facial expression of the user, and determining the emotion vector by averaging the sentiment score, the vocal score, the facial emotion score, and the dialogue performance score.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
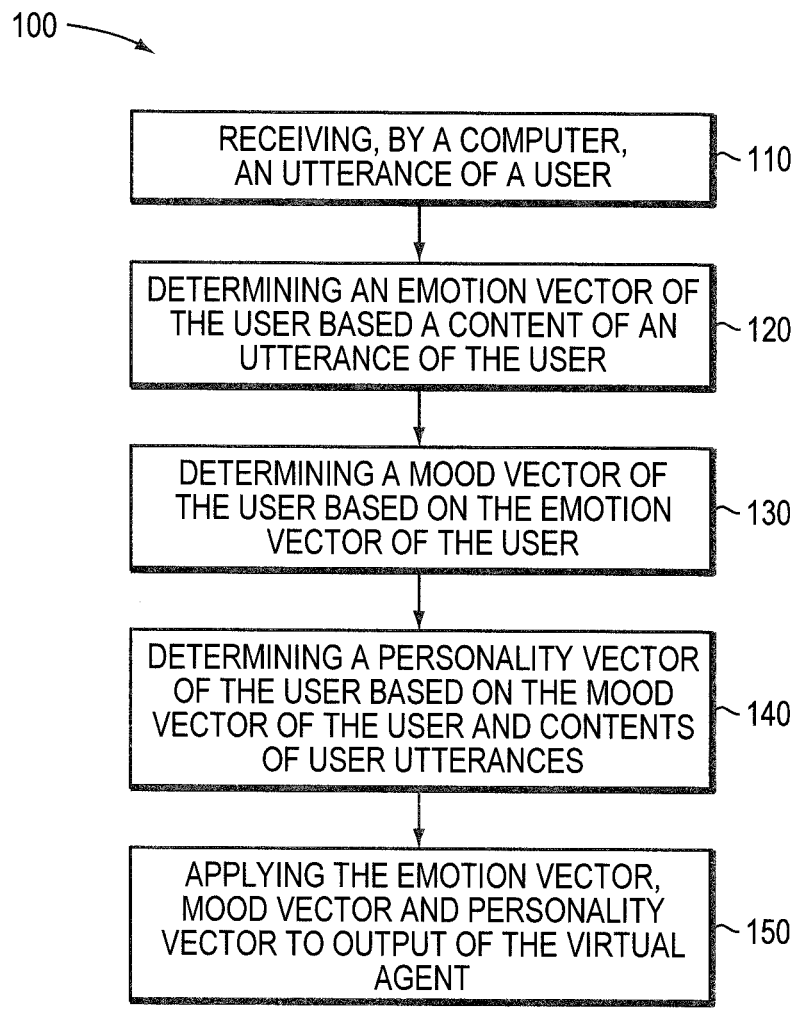
FIG. 1 is a flow chart of a method for a virtual agent to control output of a virtual agent based on a user's affect, according to an illustrative embodiment of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element. Further, where considered appropriate, reference numerals can be repeated among the figures to indicate corresponding or analogous elements.

DETAILED DESCRIPTION

In general, a virtual agent can interact with a user as a computer generated image. A dialogue between a virtual agent and a user (e.g., a person using a computer or another computer system) can occur on a turn by turn basis. For example, first a user can provide an utterance, this is the user' turn. Then, the virtual agent can provide an utterance; this is the virtual agent's turn, and so forth.

The content of the virtual agent's utterances (e.g., the words that are uttered) can be determined by one or more dialogue systems (e.g., dialogue systems as are known in the art). Each utterance by the virtual agent (e.g., a two-dimensional image, a three-dimensional image, a virtual reality rendering, and/or a hologram projection) can have accompanying facial expressions, body gestures, vocal expressions and/or verbal expression that the virtual agents presents to the user when outputting an utterance (e.g., via computer screen, phone screen, and/or large screens).

The facial expressions, body gestures, vocal expressions, and/or verbal expressions can be based on emotion, mood and personality of the user and/or emotion, mood and personality of the virtual agent in its last interaction with the user. Emotion, mood and/or personality of the virtual agent and/or user can be expressed as vectors (e.g., a pleasure, arousal and/or dominance (PAD) model). The facial expressions, body gestures, vocal expressions and/or verbal expressions can be output to a user along with the virtual agent's utterance for its turn in a dialogue with the user.

FIG. 1 is a flow chart 100 of a method for virtual agent to control output of a virtual agent based on a user's affect, according to an illustrative embodiment of the invention. The user's affect can include emotion, mood and/or personality of the user.

The method can involve receiving an utterance of a user (Step 110). The utterance of the user can be an utterance provided by the user during the user's current turn in the dialogue. The utterance of the user can be an utterance provided by the user out of the user's turn in the dialogue (e.g., the user speaks to the virtual agent during the time the virtual agent is speaking). The utterance of the user can be received from the user via a computer in the form of text, audio and/or an option based input. The utterance of the user can be a natural language utterance.

In some embodiments, the method can involve receiving voice of the user (e.g., via a microphone) and/or facial expression of the user (e.g., via a camera). In some embodiments, the method involves receiving one or more dialogue performance metrics (e.g., from a dialogue manager of the virtual agent).

The method can also involve determining an emotion vector of the user for the user's utterance based a content of the user's utterance (Step 120). The emotion vector of the user for the user utterance can be based on a sentiment score of the user utterance by determining a sentiment score for each word in the user's utterance and/or a sentiment score for the entire user utterance. The sentiment score for each word or a sentence of the user's utterance can be expressed via a PAD model. The sentiment score can be determined based on the sentiment of the user utterance's individual words, and/or data-driven approaches that can classify user's utterance into sentiment categories based on, for example, historical data (e.g., as input by a system administrator user). As is apparent to one of ordinary skill in the art, although the sentiment score as discussed herein refers to the sentiment score for the user's utterance, the sentiment score can be determined for any utterance (e.g., user or virtual agent) via the methods as described herein.

The sentiment score that is based on individual words of the user's utterance can involve assigning the individual words of the user's utterance PAD model values based. The PAD model values for each word in the user's utterance can be assigned based on pre-determined PAD model values for words. For example, each word in a dataset of words (e.g., a large data set or a dictionary) can be assigning a PAD model value. For example, PAD model value can be assigned to each word in the dataset of words based on user input (e.g., administrative user). The assigned PAD model values can be based on emotional feeling associated with words in different domains. The assigned PAD model values can be based on one or more known lexicons.

Each of the PAD model values can be on a scale of 1 to 9, where 1 can be mapped to a minimum score in a PAD model (e.g., −1) and 9 can be mapped to a maximum score in PAD model (e.g., +1). For example, word happy can have assigned values of 9.0, 6.49, and 6.63 for the PAD model values, respectively. As is apparent to one of ordinary skill in the art, the scale of 1 to 9 is for illustrative purposes only and other scales may be used.

The sentiment score that is based on individual words can also involve modifying the PAD values based on one or more rules (e.g., to assist in accounting for syntactical and/or semantical patterns of an utterance and/or can assist in recognizing the sentiment more accurately). The one or more rules can be as follows:

Rule 1: intensify the PAD model values for a particular word or words of a phrase in the user utterance by a positive factor $w_1$, if an intensifying adjective or adverb intensifies the particular word or phrase (e.g., very sad, super happy).

Rule 2: intensify the PAD model values for a particular word or words of a phrase in the user utterance by a positive factor $w_2$, if an intensifying prefix precedes an available word in the dataset of words while the full-word (e.g., word including the prefix) is not available in the dataset of words (e.g., extraordinary).

Rule 3: intensify the PAD model values for a particular word in the user utterance by a positive factor $w_3$, if an intensifying suffix follows an available word in the dataset of words while the full-word (e.g., word including the suffix) is not available in the dataset of words (e.g., helpful).

Rule 4: weaken the PAD model values for a particular word or words of a phrase in the user utterance by a positive factor $w_4$, if a weakening adjective or adverb is weakening the particular word or phrase (e.g., little sad).

Rule 5: weaken the PAD model values for a particular word or words of a phrase in the user utterance by a positive factor $w_5$, if a weakening prefix precedes an available word in the dataset of words while the full-word (i.e., word including the prefix) is not available in our the dataset of words (e.g., semi-clear).

Rule 6: weaken the PAD model value for a particular word or words of a phrase in the user utterance by a positive factor $w_6$, if a weakening suffix follows an available word in the dataset of words while the full-word (i.e., word including the suffix) is not available in the dataset of words (e.g., peaklet).

Rule 7: revert (e.g., negate scores of positive words, and neutralize values of negative words) the PAD model values for a particular word in the user utterance, if a reverting suffix follows an available word in the dataset of words while the full-word (e.g., word including the reverting suffix) is not available in the dataset of words (e.g., hopeless).

Rule 8: revert (e.g., negate scores of positive words, and neutralize values of negative words) the PAD model values for a particular word in the user utterance, if a negation term is negating an available word in the dataset (e.g., not happy).

A sentence sentiment score for a sentence of an utterance (e.g., one sentence of multiple sentences in an utterance, or the entire utterance) can be determined by assigning the PAD model values to each word in the sentence and averaging the PAD model values for all words in the sentence. For example, for a sentence S that is generated by a sequence of word (e.g., tokens $t_i$), the sentence score can be determined as follows in EQNs. 1 through 4 as follows:

$$S = t_1 t_2 t_3 \ldots t_N \qquad \text{EQN. 1}$$

$$S_{pleasure} = \frac{1}{N} \sum_{i=1}^{N} (t_i)_{pleasure} \qquad \text{EQN. 2}$$

$$S_{arousal} = \frac{1}{N} \sum_{i=1}^{N} (t_i)_{arousal} \qquad \text{EQN. 3}$$

$$S_{dominance} = \frac{1}{N} \sum_{i=1}^{N} (t_i)_{dominance} \qquad \text{EQN. 4}$$

where N is the number of tokens $t_i$.

The sentiment score based on the data-driven classifier approach can involve classifying the user utterance into one or more classes. For example, individual words of sentences may not provide an accurate sense of the sentences sentiment. In some embodiments, classifying the user utterance into one or more classes can involve deep learning and Recurrent Neural Network (RNN) methods (e.g., as discussed in further detail below).

In some embodiments, classifying the user utterance into one or more classes involves training a Bidirectional Long-Short-Term-Memory (B-LSTM) classifier to consider words in the user utterance in both left-to-right and right-to-left directions.

In some embodiments, classifying the user utterance into one or more classes involves classifying the user utterance as negative, neutral and/or positive. In various embodiments, the one or more classes includes additional classes to, for example, provide a higher level of fidelity in selecting classes (e.g., very positive, very negative). In some embodiments, the classifications negative, neutral and/or positive are each assigned a polarity value. The polarity value can be float values in the range of −0.75, 0.0, and +0.75. In some embodiments, the polarity value is interpreted as a sentiment score, which can be used as the pleasure value of the PAD model. In some embodiments, the polarity value is aggregated with the pleasure value of the sentiment scores (e.g., the word and/or sentence sentiment scores as described above). In various embodiments, the classification value is aggregated with the pleasure value, the arousal value and/or the dominance value of the PAD model values.

In some embodiments, the emotion vector of the user for the user utterance is based on the one or more received dialogue performance metrics. The emotion vector of the user for the user utterance can be based on a dialogue performance score. The one or more dialogue performance metrics can include metrics that can be used to estimate how successful a conversation between the virtual agent and the user in process of being carried out is (e.g., in real-time) to determine the dialogue performance score.

The one or more dialogue performance metrics can include a length of dialogue, domain of dialogue, number of misunderstandings, number of repetitions, and/or number of clarification requests by a respective dialogue manager. For example, if the dialogue manager has multiple misunderstandings of the user's utterances and causes the virtual agent to seek clarification multiple times, it can be expected that the user may feel disappointed (e.g., depending on a number of misunderstandings and clarification requests).

In some embodiments, the one or more dialogue performance metrics and an OCC cognitive appraisal model are used to determine the dialogue performance score, and/or predict the user's emotion. The OCC cognitive appraisal model can map every event and/or action into an emotion (or a set of emotions) based on the dialogue performance metrics such as desirability of event/action, praiseworthiness of event/action, appeal of objects, focus of the event on agent and/or user, and/or relevance to the user and/or virtual agent prospect.

The OCC dialogue performance metrics can predict one or more emotions for the user based on the dialogue performance metrics and a list of possible emotions for the user. A higher number of dialogue performance metrics used in the OCC cognitive appraisal model, a higher accuracy can result with regard to the prediction of the user's emotion and a number of emotions in the possible emotions list can be smaller. If the OCC cognitive appraisal model has all variables to predict an emotion, it can predict a single emotion; otherwise, a list of most probable emotions can be provided by the OCC cognitive appraisal model.

The OCC cognitive appraisal model list of emotions can include shame, remorse, reproach, anger, pride, gratification, joy, and/or distress. Each of the listed emotions can have a corresponding set of PAD model values. For example, PAD model values for the remorse emotion can be set to −0.3, 0.10, and −0.60, respectively. The PAD model values for the listed emotions can be input by a user (e.g., system administrator) and/or based on the scores provided in the PAD model research by its authors.

If a single emotion from the listed emotions is determined for the user, the PAD model values of the single emotion can be used as the dialogue performance score for that user. If multiple emotion from the listed emotions are determined (e.g., there is uncertainty regarding the user's emotion), an average of the PAD model values for the multiple OCC cognitive appraisal model determined emotions can be used for the dialogue performance score. For example, for multiple emotions from the OCC cognitive appraisal model, the dialogue performance score D can be determined as shown below in EQNs. 5-8 as follows:

$$\text{predicted } OCC \text{ emotions} = \{e_1, e_2, \ldots, e_N\} \qquad \text{EQN. 5}$$

$$D_p = \frac{1}{M} \sum_{i=1}^{M} (e_i)_p \qquad \text{EQN. 6}$$

$$D_a = \frac{1}{M}\sum_{i=1}^{M}(e_i)_a \qquad \text{EQN. 7}$$

$$D_d = \frac{1}{M}\sum_{i=1}^{M}(e_i)_d \qquad \text{EQN. 8}$$

where $e_i$ is an emotion from the list of emotions (e.g., OCC emotion), M is a number of emotions from the list of emotions determined, and p, a, d are pleasure, arousal, dominance, respectively.

In some embodiments, the emotion vector of the user for the user utterance is based on the received vocal characteristic of the user (e.g., received via microphone and/or an audio file) when the user utterance includes spoken words by the user. The emotion vector of the user for the user utterance can be based on a vocal emotion score. One or more vocal characteristics (e.g., volume, pitch, speed, frequency, energy, and/or intonation) of the user can be classified into one or more voice emotion categories (e.g., happy, angry, sad, surprised, disgusted, and/or scared). Each of the voice emotion categories can have corresponding PAD model values (e.g., as input by an administrator user). For each user utterance the vocal emotion score can be a PAD model value that corresponds to the voice emotion category to, for example, reflect the user's vocal emotion.

In some embodiments, the emotion vector of the user for the user utterance is based on the received facial expressions of the user (e.g., as captured via a camera coupled to a computer). The emotion vector of the user for the user utterance can be based on a facial emotion score. For example, a user may have one or more different facial expressions during an utterance. One or more facial expression recognizers can identify facial expression landmarks (e.g., around mouth, nose, eyes, and/or eyebrows) to classify the facial expression into one or more facial emotion categories (e.g., happy, angry, sad, surprised, disgusted, and/or scared). Each of the facial emotion categories can have corresponding PAD model values (e.g., as input by an administrative user). For each user utterance the facial emotion score can be a PAD model value that corresponds to the facial emotion category to, for example, reflect the user's facial expressions.

In some embodiments, the emotion vector of the user for the user utterance is set to the sentiment score. In some embodiments, the emotion vector of the user for the user utterance is set to the dialogue performance score. In some embodiments, the emotion vector of the user for the user utterance is set to the vocal emotion score. In some embodiments, the emotion vector of the user for the user utterance is set to the facial emotion score. In various embodiments, the emotion vector of the user for the user utterance is based on any combination of the sentiment score, the dialogue performance score, the vocal emotion score and the facial emotion score.

In some embodiments, the emotion vector of the user for the user utterance is determined by a polynomial function of the sentiment score, the vocal emotion score, the facial emotion score, and/or the dialogue performance score. For example, the emotion vector of the user for the user utterance $E_{PAD}^{User}$ can be determined by a weighted average of the sentiment score, the vocal emotion score, the facial emotion score, and/or the dialogue performance score, which can be referred to as emotion scores, as determined below in EQNs 9-12, as follow:

$$E_p^{User} = \frac{1}{R}\sum_{i=1}^{R} w_i(es_i)_p \qquad \text{EQN. 9}$$

$$E_a^{User} = \frac{1}{R}\sum_{i=1}^{R} w_i(es_i)_a \qquad \text{EQN. 10}$$

$$E_d^{User} = \frac{1}{R}\sum_{i=1}^{R} w_i(es_i)_d \qquad \text{EQN. 11}$$

$$\sum_{i=1}^{R} w_i = 1 \qquad \text{EQN. 12}$$

where $es_i$ is the particular emotion score, N is an integer value for the number of emotion scores used, $w_i$ is a weighting factor that can be used to weight each particular emotion score in the emotion vector of the user. In various embodiments, the weights $w_i$ can be set such that they sum up to 1 and cause the emotion vector of the user for the user utterance to be a value between −1 and +1, or any combination thereof.

Figure 2:
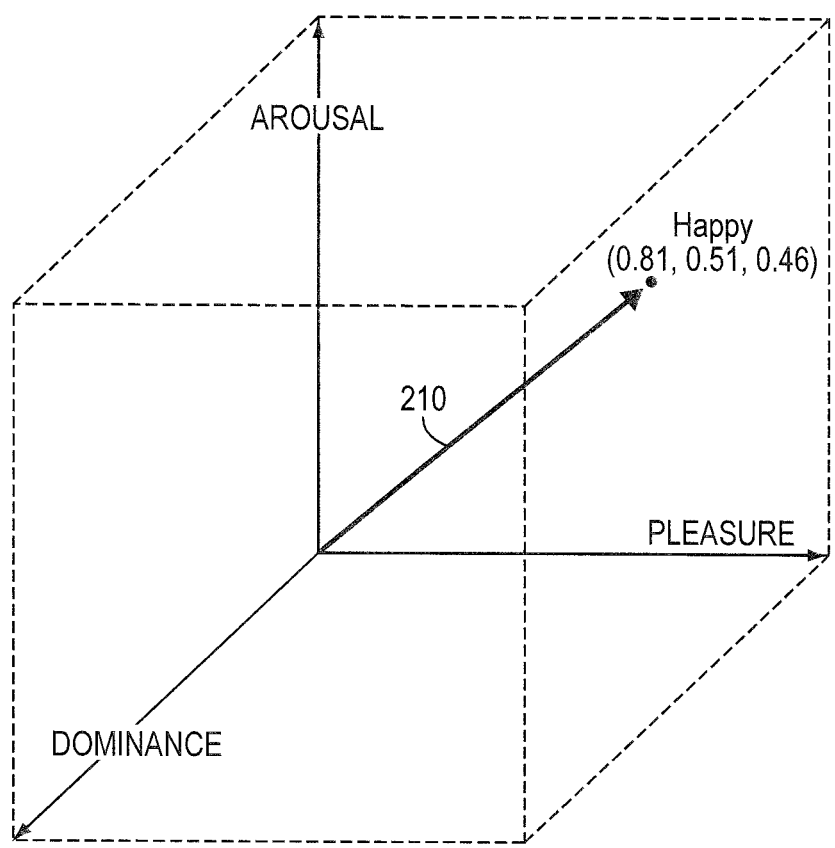
FIG. 2 is a graph showing an emotion vector for a user in a pleasure, arousal, and dominance (PAD) space, according to an illustrative embodiment of the invention.

FIG. 2 is an example of an emotion vector 210 for a user $E_{PAD}^{User}$ in the PAD space, according to an illustrative embodiment of the invention. The emotion vector 410 indicates a happy emotion for the user vector values equivalent to the PAD model values for the emotion vector. In the example of FIG. 2, the emotion vector has vector values of 0.81, 0.51 and 0.46, corresponding to emotion vector the PAD model values for pleasure, arousal and dominance, respectively.

Turning back to FIG. 1, the method can also involve determining a mood vector of the user based on the emotion vector of the user for the user utterance (Step 130). The mood vector of the user can track the emotion vector of the user. In some embodiments, the mood vector of the user changes less frequently (e.g., with a slower pace) than the emotion vector of the user. In some embodiments, the longer the user stays in a particular emotional state, the closer the mood vector of the user becomes to the emotion vector of the user, until eventually, there is an overlap between the mood vector of the user and the emotion vector of the user.

In some embodiments, the mood vector of the user can track the emotion vector of the user for the user utterance as shown below in EQN. 13 through 18, with the accompanying description. The emotion vector of the user for the user utterance and the mood vector of the user can be expressed as vectors in the PAD space.

The mood vector of the user can be defined in a plane defined by the emotion vector of the user for the user utterance and a previous mood vector of the user which can be initially set to a default positive score for pleasure (e.g., +0.5), arousal (e.g., +0.5), and dominance (e.g., +0.5). The mood vector of the user $\vec{G}$ can have a 90 degree rotation from the previous mood vector of the user. The mood vector of the user $\vec{G}$ can be described as shown below in EQN. 13, as follows:

$$\vec{G} = \vec{e} - \vec{m}\frac{\vec{m}\cdot\vec{e}}{\vec{m}\cdot\vec{m}} \qquad \text{EQN. 13}$$

where $\vec{e}$ is the emotion vector of the user for the user utterance, and $\vec{m}$ is the previous mood vector of the user. The mood vector of the user $\vec{G}$ can be normalized and scaled by normalization (e.g., shown by ‖•‖) of the previous mood vector of the user, as shown below in EQN. 14 as follows:

$$\vec{G'} = \vec{G}\frac{\|\vec{m}\|}{\|\vec{G}\|} \quad \text{EQN. 14}$$

An angle θ between the mood vector of the user and the emotion vector of the user for the user utterance can be determined by rotating the previous mood vector of the user towards the emotion vector of the user for the user utterance. The angle θ can be calculated by rotating the mood vector of the user (which is located φ degrees away from emotion vector of the user for the user utterance), with a rotation rate of α (e.g., a rate at which the mood vector of the user follows the emotion vector of the user for the user utterance). Therefore, after rotation, the mood vector of the user stays θ degrees away from the emotion vector of the user for the user utterance. The rotation rate can be set by the system administrator user, depend on a type of the virtual agent, or any combination thereof. The mood vector of the user $\vec{G}$ can be determined based on the normalized mood vector of the user $\vec{G'}$, the emotion vector of the user for the user utterance $\vec{e}$, the mood vector of the user $\vec{m}$, the angle between the mood vector of the user and the emotion vector of the user for the user utterance φ and the rotation rate α of φ. For example, as described below in EQNs. 16-18:

$$\varphi = a\cos\left(\frac{\vec{m}\cdot\vec{e}}{\|\vec{m}\|\cdot\|\vec{e}\|}\right) \quad \text{EQN. 16}$$

$$\theta = \alpha \cdot \varphi \quad \text{EQN. 17}$$

$$\vec{G} = \cos(\theta)\vec{m} + \sin(\theta)\vec{G'} \quad \text{EQN. 18}$$

In some embodiments, if the desired angle φ between emotion vector of the user for the user utterance $\vec{e}$ and the previous mood vector of the user $\vec{m}$ is equal to π radians, then ‖$\vec{G'}$‖ can become zero, which can cause the mood vector of the user to match the emotion vector of the user for the user utterance. In these embodiments, a very small random change to the mood vector of the user can be made before determining the desired angle θ such that the mood vector of the user does not exactly match the emotion vector of the user for the user utterance. For example, a small random number can be added between −0.01 and +0.01 to each of the 3 dimensions of the previous mood vector of the user $\vec{m}$.

Figure 3:
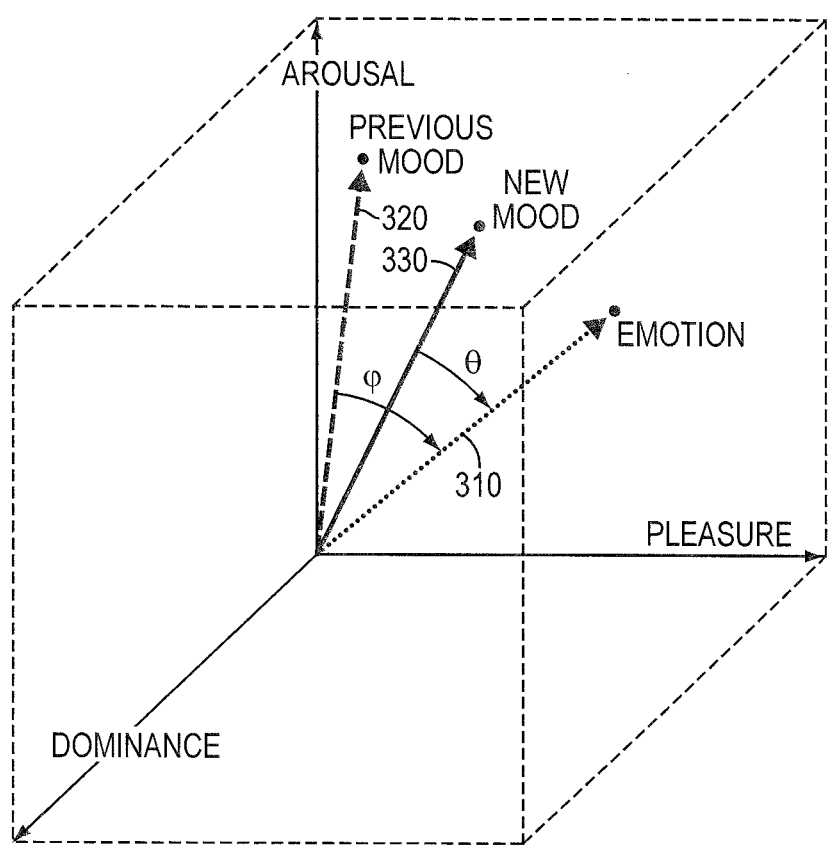
FIG. 3 is a graph of a mood vector for a user, an emotion vector for the user, a previous mood vector for the user in a PAD space, according to an illustrative embodiment of the invention.

FIG. 3 shows an example of an emotion vector of the user for the user utterance 310, a previous mood vector 320, and a mood vector 330 in PAD space, according to an illustrative embodiment of the invention.

Turning back to FIG. 1, the method can also involve determining a personality vector of the user based on the mood vector of the user and/or contents of user utterance (Step 140). The personality vector of the user can be based on one or more personality traits of the user (e.g., open, conscientious, extrovert, agreeable and/or neurotic) and/or behavioral vectors of the user based on syntactic and semantic natural language vectors of personality in conversations, and/or the mood vector of the user.

The behavioral vectors can be based on content of the user utterance. For recognizing personality traits from text, an aggregation of approaches that take into account individual words of the user utterance (e.g., a bag-of-words approach), and data-driven classification approaches can be used. Each approach can provide a probability for each of the one or more personality traits of the user. The personality vector of the user can be determined as a polynomial function of the bag-of-words approach and data-drive classification approaches, for example, weighted average of each of the one or more personality traits as shown below in EQNs. 19-21, as follows:

$$p_{BOW} = w_{o1}O + w_{c1}C + w_{e1}E + w_{a1}A + w_{n1}N \quad \text{EQN. 19}$$

$$p_{DD} = w_{o2}O + w_{c2}C + w_{e2}E + w_{a2}A + w_{n2}N \quad \text{EQN. 20}$$

$$p = avg(p_{BOW}, p_{DD}) = avg(w_{o1}, w_{o2})O + avg(w_{c1}, w_{c2})C + \\ avg(w_{e1}, w_{e2})E + avg(w_{a1}, w_{a2})A + avg(w_{n1}, w_{n2})N \quad \text{EQN. 21}$$

where avg(•) stands for average, O is an open personality trait, C is a conscientious personality trait, E is an extrovert personality trait, A is an agreeable personality trait, N is a neurotic personality trait, $p_{BOW}$ is the probabilities for the bag-of-words analysis, $p_{DD}$ is the probabilities for the data-driven classification approach, $w_{o1}$ and $w_{o2}$ are weights of open personality in determining the user's personality using the bag-of-word and data-driven classification approaches respectively, $w_{c1}$ and $w_{c2}$ are weights of conscientious personality in determining user personality using the bag-of-word and data-driven classification approaches, $w_{e1}$ and $w_{e2}$ are weights of extrovert personality in determining user personality using the bag-of-word and data-driven classification approaches respectively, $w_{a1}$ and $w_{a2}$ are weights of agreeable personality in determining user personality using the bag-of-word and data-driven classification approaches respectively, and $w_{n1}$ and $w_{n2}$ are weights of neurotic personality in determining user personality using the bag-of-word and data-driven classification approaches respectively.

The five personality categories can be converted to PAD model values in order to, for example, aggregate the personality categories with the previous mood vector of the user. The conversion can be as shown below in EQN. 22 through 24, as follows:

pleasure=0.21E+0.59A+0.19N  EQN. 22 arousal=0.15×O+0.30A−0.57N  EQN. 23 dominance=0.25×O+0.17C−0.32A+0.60E  EQN. 24 where the numerical values can be input by a user (e.g., system administrator user).

The personality vector of the user can have PAD values as determined above in EQNs. 22-24. The personality vector of the user can be expressed as a vector in PAD space. A personality vector of the user can follow the mood vector of the user. The personality vector of the user can follow the mood vector of the user with a slower pace than the mood vector of the user changes. For example, if the user has a similar mood for a time duration, the personality vector of the user can match the mood vector of the user. The personality vector of the user can be defined in a plane defined by the mood vector of the user and a previous personality vector of the user. The personality vector of the user $\vec{H}$ can have a 90 degree rotation from the previous personality vector of the user. The personality vector of the user $\vec{H}$ can be described as shown below in EQN. 25:

$$\vec{H} = \vec{m} - \vec{p}\frac{\vec{p} \cdot \vec{m}}{\vec{p} \cdot \vec{p}}$$ EQN. 25 where $\vec{m}$ is the mood vector of the user and $\vec{p}$ is the previous personality vector of the user. The personality vector of the user $\vec{H}$ can be normalized and scaled by normalization (e.g., shown by $\|\cdot\|$) of the previous personality vector, as shown below in EQN. 26, as follows:

$$\vec{H'} = \vec{H}\frac{\|\vec{p}\|}{\|\vec{H}\|}$$ EQN. 26

An angle ω between the personality vector of the user and the mood vector of the user can be determined by rotating the previous personality vector of the user towards the mood vector of the user. The angle ω can be calculated by rotating the personality vector of the user (which is located ψ degrees away from emotion vector), with a rotation rate of β (e.g., a rate at which the personality vector follows the mood vector). Therefore, after rotation, the personality vector of the user stays ω degrees away from the mood vector of the user. The rotation rate can be set by the system administrator, depend on a type of the virtual agent, or any combination thereof. The personality vector of the user $\vec{H}$ can be determined based on the normalized personality vector of the user $\vec{H'}$, the mood vector of the user $\vec{m}$, the previous personality vector of the user $\vec{p}$, the angle between the personality vector of the user and the mood vector of the user ψ and the rotation rate β of ψ. For example, as described below in EQNs. 27-29:

$$\psi = a\cos\left(\frac{\vec{p} \cdot \vec{m}}{\|\vec{p}\| \cdot \|\vec{m}\|}\right)$$ EQN. 27

$$\omega = \beta \cdot \psi$$ EQN. 28

$$\vec{H} = \cos(\omega)\vec{p} + \sin(\omega)\vec{G'}$$ EQN. 29

In some embodiments, if the angle ω between mood vector of the user m and the previous personality vector of the user $\vec{p}$ is equal to π radians, then $\|\vec{G'}\|$ can become zero, which can cause the personality vector of the user to match the mood vector of the user. In these embodiments, a very small random change to the personality vector of the user can be made before determining the desired angle ω such that the personality vector of the user does not exactly match the mood vector of the user. For example, a small random number can be added between −0.01 and +0.01 to each of the 3 dimensions of the previous personality vector of the user $\vec{p}$.

Figure 4:
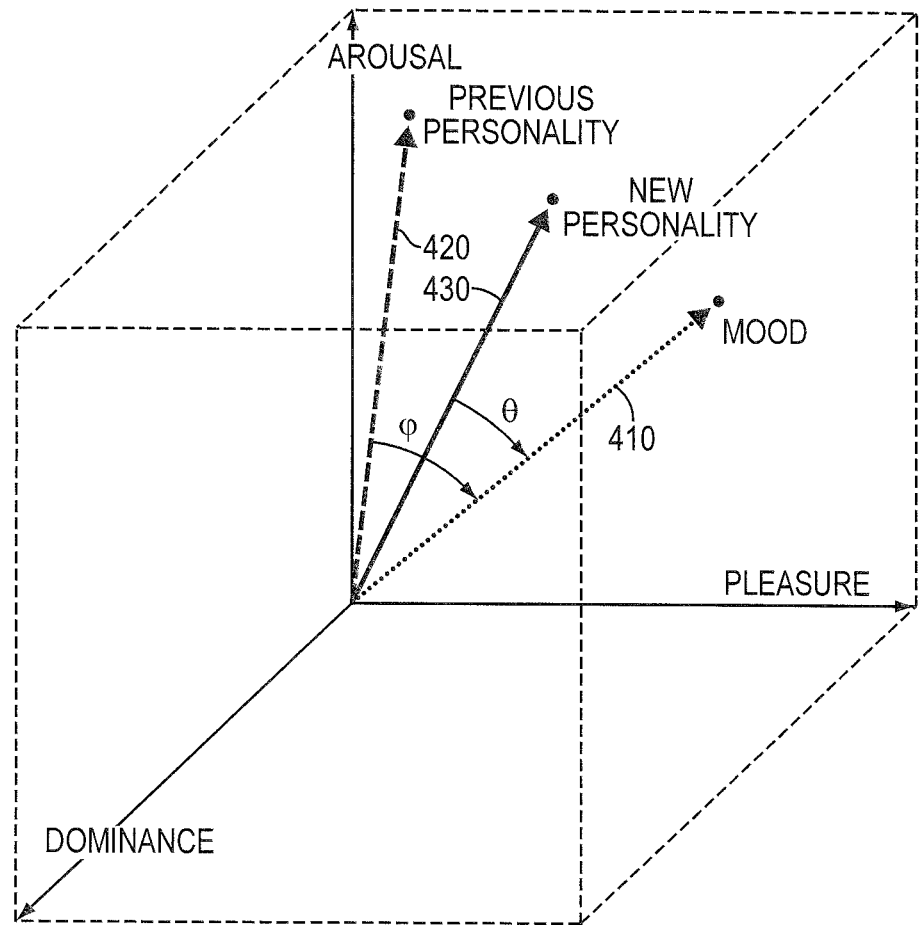
FIG. 4 shows an example of a personality vector for a user, a mood vector for a user, a previous personality vector for the user, in PAD space, according to an illustrative embodiment of the invention

FIG. 4 shows an example of a mood vector of the user 410, a previous personality vector of the user 420, and a personality vector of the user 430 in PAD space, according to an illustrative embodiment of the invention.

Turning back to FIG. 1, the method can also involve applying the emotion vector of the user, mood vector of the user and personality vector of the user to output of the virtual agent (Step 150). Applying the emotion vector of the user, the mood vector of the user and/or the personality vector of the user to the virtual agent can involve instructing the virtual agent to modify one or more statements, facial expressions, vocal expressions, or body language to match and/or change an emotional state of the user. For example, as described below in FIG. 6.

The emotion vector of the user, the mood vector of the user and/or the personality vector of the user can be inputs to the methods/modules as described below in FIG. 6 and FIG. 7.

In some embodiments, an emotion satisfaction score and/or cognitive satisfaction score of the user can be determined. The emotional and/or cognitive satisfactions scores of the user can be based on the emotion vector of the user (e.g., as described above in FIG. 1, Step 110) and/or one or more dialogue performance metrics (e.g., from one or more dialogue mangers of the virtual agent). The one or more dialogue performance metrics can include length of dialogue, number of misunderstandings, number of repetitions, and/or number of clarification requests by a respective dialogue manager.

In some embodiments, an overall satisfaction score can be determined by taking a polynomial function of the emotional and cognitive satisfaction scores, for example, weighted average of the emotion satisfaction score and the cognitive satisfaction score.

The user's emotion satisfaction score can be determined differently when the user's emotion vector indicates a positive pleasure versus negative pleasure. If the user's emotion vector indicates a negative pleasure, the satisfaction score can be affected more by the arousal score than when emotion is positive pleasure, as shown below in EQN. 30 as follows:

$$Sat = \begin{cases} 0.53p + 0.14a + 0.11d + 0.10ad + 0.22, & p > 0 \\ 0.53p + 0.58a + 0.11d + 0.10ad - 0.22, & p \leq 0 \end{cases}$$ EQN. 30 where Sat are satisfaction score and p, a, and d pleasure, arousal, and dominance model values for the emotion vector of the user.

The user's cognitive satisfaction can be based on a reward/punishment approach. For all dialog performance metrics that indicate a user's satisfaction, a reward score can be assigned, and for all dialog performance metrics indicate a user's dissatisfaction, a punishment score can be assigned. Reward and punishment scores can be added to the current cognitive satisfaction score after each user utterance. If the overall current cognitive satisfaction score is above a predetermined threshold, for example +2, the user can be indicated as satisfied. If the overall current cognitive satisfaction score is less than the predetermined threshold, for example −1.5, the user can be indicated as dissatisfied. If score is between the two above thresholds, user can be indicated as neutral in satisfaction. In some embodiments, reward/punishment scores can be determined based on the dialogue performance metrics as follows:

Reward: +1, if the dialogue has not escalated to a human agent;

Punishment: −20, if conversation is escalated to a human agent;

Reward: +1, if a user utterance is understood correctly;

Punishment: −5, if a user utterance is misunderstood;

Reward: +1, if the virtual agent does not need to clarify an uncertain utterance understanding;

Punishment: −2, if the virtual agent requests for clarification from user;

Reward: +10, if the user provides an utterance containing a positive statement;

Punishment: −1: if the user does not provide an utterance containing a positive statement;

Reward: +1, if the user does not provide an utterance containing a negative statement;

Punishment: −10, if the user provides an utterance containing a negative statement;

Reward: +1, if the virtual agent has a long conversation with the user. In different conversation domains, the preferred conversation length can be different. For example, it can be set to 3 user utterance; and Punishment: −1, if the virtual agent cannot have a long conversation with the user. In different conversation domains, the preferred conversation length can be different. For example, it can be set to 3 user utterance.

Events in a dialog manager can include the actions that the dialogue manager takes for managing the conversation, e.g., ask, confirm, respond. The user's prospects can be to fulfil the goal in a goal-oriented dialogue. During a conversation, the number of all pleasant/unpleasant, prospect relevant/irrelevant, and confirmed/disconfirmed events, can be rewarded or punished to estimate a score for the cognitive satisfaction.

In some embodiments, a formality of the user (e.g., how formal the user is speaking) can be determined from the utterance of the user. The formality module can be used to adapt the virtual agent's output to a formality that is similar to the formality of the user. Adapting the formality of the virtual agent's output to the formality of the user can give the virtual agent the appearance, to the user, that the virtual agent respects the user's dialogue formality preferences.

The formality level can be captured by recognizing syntactic and/or semantic patterns that indicate a formality level for the user. The user's formality level can be based on (1) relative frequency of different Part-of-Speech (POS) tokens (e.g., noun, adjective, preposition, article, pronoun, verb, adverb, interjection), emoticons, and/or misspelled words in the user's utterance and/or (2) data-driven classification. The formality level can be classified into one of the three classes of formal, neutral, and informal. If both the POS token approach and the data-drive deep learning approach both result in the same formality class, a final formality class can be set to that result, otherwise, the final formality can be set to neutral.

The formality can be determined based on a frequency of word types used in many user utterances in different sessions that the user and the virtual agent have had. For example, as shown below in equations EQN. 31 to EQN. 44 as follows:

$$s_1 = 0.5 \times \left[ \sum (Freq_{nouns} + Freq_{adjectives} + Freq_{prepositions} + Freq_{articles} - Freq_{pronouns} - Freq_{verbs} - Freq_{adverbs} - Freq_{interjections}) + 100 \right] \quad \text{EQN. 31}$$

$$f_1 = \begin{cases} +1, & s_1 \geq 37 \\ 0, & 36 < s_1 < 37 \\ -1, & s_1 \leq 36 \end{cases} \quad \text{EQN. 32}$$

$$s_2 = 1.189 \times \left( \frac{100 \times Freq_{adjectives}}{Freq_{words}} - 2.998 \right) \quad \text{EQN. 33}$$

$$f_2 = \begin{cases} +1, & s_2 \geq 4.08 \\ 0, & 3.8 < s_2 < 4.08 \\ -1, & s_2 \leq 3.8 \end{cases} \quad \text{EQN. 34}$$

$$s_3 = \frac{100 \times \sum \left( \frac{Freq_{misspelled\,words} +}{Freq_{interjections} + Freq_{emoticons}} \right)}{Freq_{total\,words}} \quad \text{EQN. 35}$$

$$\text{informality} = \begin{cases} -1, & s_3 \geq 60 \\ 0, & 40 < s_3 < 60 \\ +1, & s_3 \leq 40 \end{cases} \quad \text{EQN. 36}$$

$$\text{formality} = \begin{cases} \text{FORMAL}, & f_1 + f_2 + \text{informality} \geq 1 \\ \text{NEUTRAL}, & -1 < f_1 + f_2 + \text{informality} < 1 \\ \text{INFORMAL}, & f_1 + f_2 + \text{informality} \leq -1 \end{cases} \quad \text{EQN. 37}$$

In some embodiments, a personal profile of the user is determined. The personal profile can include key-value pairs captured, for example, from the user's utterances that can show the user's personal information, preferences, likes, dislikes, favors, beliefs, values, needs, etc. The personal profile can be populated and/or updated as the user-virtual agent dialogue in different sessions go on. At every timestamp of the conversation, the virtual agent can use the most updated user's profile to provide personalized responses to the user.

In some embodiments, context-free grammars can be used to parse the user's utterances. When a pattern in the user's utterance that is related to the user's personal profile is matched, a corresponding profile attribute can be updated with that piece of information. For example, if the user says "My favorite color is blue," it matches the patterns defined for "favorite color" profile attribute. The color "blue" can be added to the user's favorite colors. Conversely, if user says "My favorite color is not blue," or "I don't like blue," this color can be removed from user's favorite colors if available.

Figure 5:
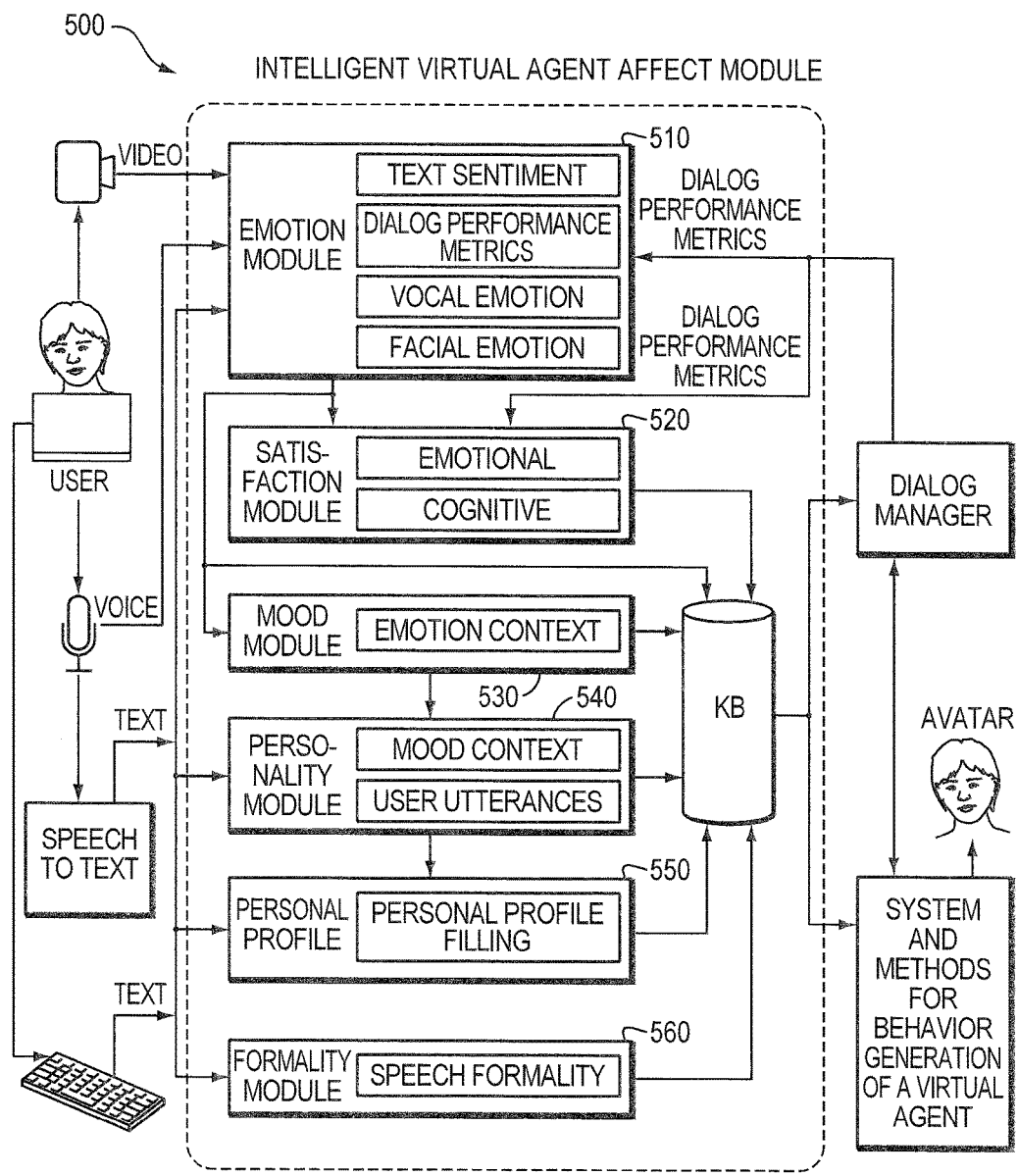
FIG. 5 is a diagram of system architecture to control output of a virtual agent based on a user's affect, according to an illustrative embodiment of the invention.

FIG. 5 is a diagram of a system 500 architecture for virtual agent to control output of a virtual agent based on a user's affect, according to an illustrative embodiment of the invention.

The system 500 can include an emotion module 510, a satisfaction module 520, a mood module 530, a personality module 540, a personal profile module 550, and/or a formality module 560.

The emotion module 510 can take as input a user utterance, one or more voice characteristics of the user utterance, one or more facial expressions of the user utterance and/or one or more dialogue performance metrics. The user utterance can be input via spoken words of the user and/or typed text (e.g., via a computer, smart phone, tablet or any other computing device as is known in the art). The one or more voice characteristics of the user can include vocal fluctuations (e.g., volume, pitch, speed, frequency, energy, and/or intonation) of the user that can be received via a microphone and/or an audio file of the user. The one or more facial expressions of the user can include a blink, gaze, brow movement and/or smile that can be received via a camera (e.g., pictures and/or video). The one or more dialogue metrics can be received from one or more dialogue managers of the virtual agent. The emotion module can output an emotion vector of the user for the user utterance (e.g., as described above in FIG. 1, Step 120) based on one or more of the inputs.

The satisfaction module 520 can take as input the emotion vector of the user and one or more dialogue performance metrics. The satisfaction module 520 can determine the user's emotional satisfaction and/or the user's cognitive satisfaction (e.g., as described above in FIG. 1). The satisfaction module 520 can output an emotion satisfaction score and/or a cognitive satisfaction score (e.g., as described above in FIG. 1).

The mood module 530 can take as input the emotion vector of the user and/or a rotation rate. The mood module 530 can output a mood vector of the user (e.g., as described above in FIG. 1, Step 130).

The personality module 540 can take as input the user utterance, the mood vector of the user and/or a rotation rate. The personality module 540 can output a personality vector of the user (e.g., as described above in FIG. 1, Step 140).

The personal profile module 550 can take the user utterance and update/modify a personal profile of the user based on the user utterance. The formality module 560 can take as input the user utterance and output a formality level for the user.

The outputs from each of the emotion module 510, satisfaction module 520, mood module 530, personality module 540 and/or persona profile module can be stored in a database KB.

In some embodiments, one or more of the outputs of the system 500 are input to systems for behavior generation of a virtual agent (e.g., the system 200 as described below in FIG. 7).

Figure 6:
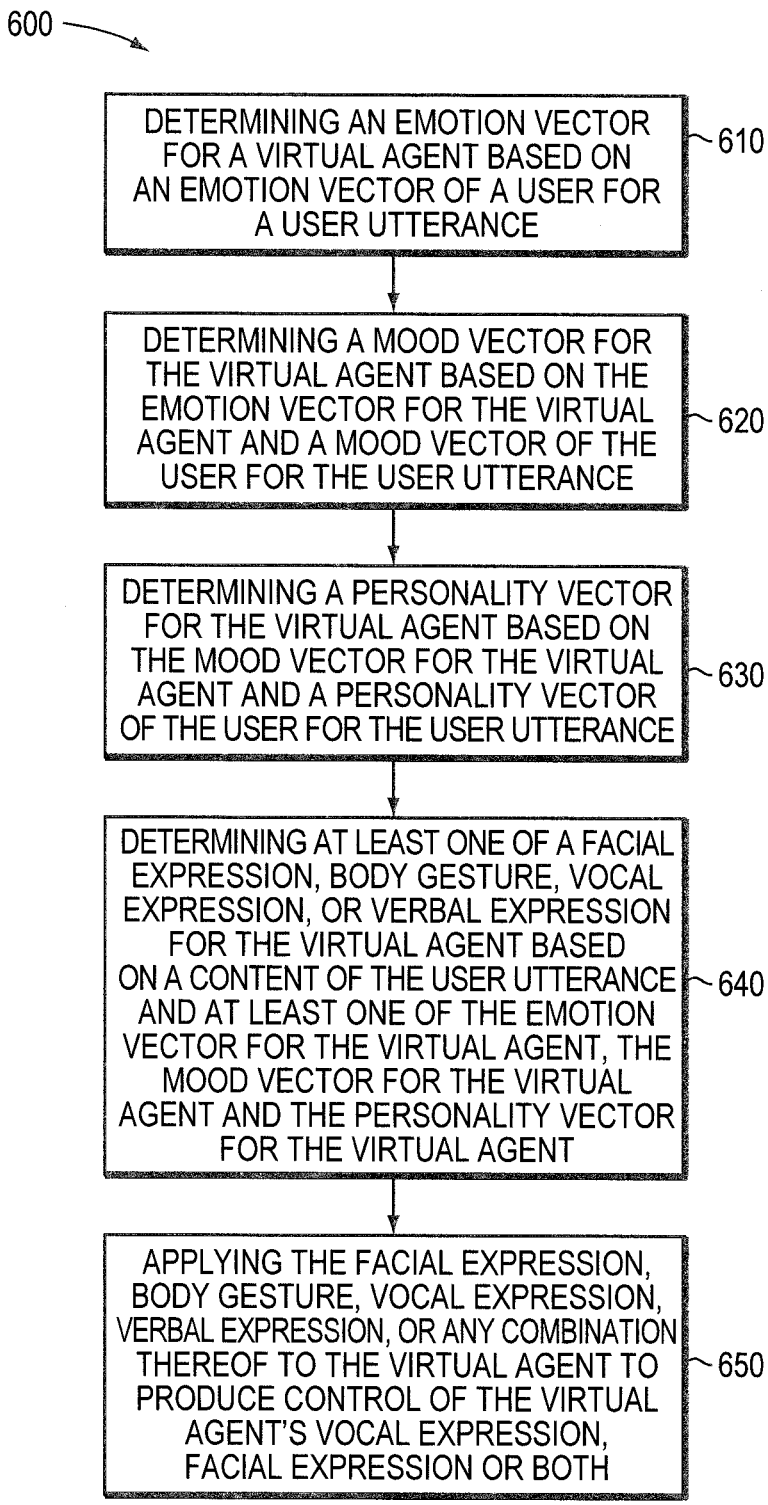
FIG. 6 is a flow chart of a method for automatically generating at least one of facial expressions, body gestures, vocal expressions or verbal expressions for a virtual agent, according to an illustrative embodiment of the invention.

FIG. 6 is a flow chart 600 for automatically generating at least one of facial expressions, body gestures, vocal expressions, or verbal expressions for a virtual agent (not shown), according to an illustrative embodiment of the invention.

The method can involve determining emotion vector for the virtual agent based on an emotion vector of a user (e.g., as described above in FIG. 1) for a user utterance (e.g., an utterance of the last turn of the user in a dialogue) (Step 610). The user utterance can be received from the user via a computer in the form of text, audio or option based input. The user utterance can be a natural language utterance.

In various embodiments, the emotion vector for the virtual agent is based on the emotion vector of the user for the user utterance, an emotion indicator of the virtual agent for current utterance of the virtual agent, an emotion vector for the virtual agent's last utterance, or any combination thereof. The emotion indicator of the virtual agent for the current utterance of the virtual agent can be based on a sentiment of the virtual agent's current utterance and/or expressed as a PAD model vector. The sentiment of the virtual agent's current utterance can be determined via the same methods as the sentiment of the user's utterance is determined, as described above in FIG. 1.

The current utterance can be an utterance provided by a dialogue management system for the virtual agent to provide on its turn in the dialogue, in response to the user's utterance. The last utterance of the virtual agent can be an utterance provided by the virtual agent in the last turn of the virtual agent before the current turn.

In some embodiments, determining the emotion vector for the virtual agent involves assigning a weight to at least one of the emotion vector of the user for the user utterance, the emotion indicator of the virtual agent for current utterance of the virtual agent, or the emotion vector for the virtual agent's last utterance. In some embodiments, the emotion vector for the virtual agent $E_{PAD}^{Agent}(t)$ can be determined as shown below in EQN. 38, as follows:

$$E_{PAD}^{Agent}(t) = \qquad \text{EQN. 38}$$

$$\alpha E_{PAD}^{User}(t) + \beta E I_{PAD}^{Agent}(t) + \gamma E_{PAD}^{Agent}(t-1) = \begin{pmatrix} E_p^{Agent}(t) \\ E_a^{Agent}(t) \\ E_d^{Agent}(t) \end{pmatrix} =$$

$$\alpha \begin{pmatrix} E_p^{User}(t) \\ E_a^{User}(t) \\ E_d^{User}(t) \end{pmatrix} + \beta \begin{pmatrix} EI_p^{Agent}(t) \\ EI_a^{Agent}(t) \\ EI_d^{Agent}(t) \end{pmatrix} + \gamma \begin{pmatrix} E_p^{Agent}(t-1) \\ E_a^{Agent}(t-1) \\ E_d^{Agent}(t-1) \end{pmatrix}$$

Where, $E^{User}(t)$ is the emotion vector of the user for the user utterance, $EI^{Agent}(t)$ is the emotion indicator for the virtual agent's current utterance, $E^{Agent}(t-1)$ is the emotion vector for the virtual agent's last utterance, t is time, and p, a, and d stand for pleasure, arousal, and dominance, respectively. Coefficient α can be set to weight the effect of the user's emotion vector on the virtual agent's emotion (e.g., the user's emotion during the user's utterance), β can be set to weight the effect of the emotion indicator for the virtual agent's current utterance (e.g., sentiment of the utterance for the virtual agent's current turn), and γ can be set to weight the emotion vector for the virtual agent's last utterance (e.g., the emotion of the virtual agent during its last turn).

In various embodiments, the weights are set as system configuration settings, input by a user (e.g., an administrative user) and/or determined based on application type of the virtual agent. For example, comparing a competitive gamer virtual agent and a tourist-information virtual agent, α for the gamer agent can be selected to be smaller than the tourist-information agent, because, in this example, the gaming agent can be set to empathize less with the user (e.g., as an opponent) than the tourists-information agent (e.g., as a service provider).

The method can involve determining a mood vector for the virtual agent based on the emotion vector for the virtual agent and a mood vector of a user for the user utterance (Step 620). The mood vector of the user for the user utterance can indicate a mood state of the user when the user provided the utterance. The mood vector can be expressed via a PAD model.

In various embodiments, the mood vector for the virtual agent is based on the emotion vector for the virtual agent, the mood vector of a user for the user utterance, a mood vector for the virtual agent's last utterance, or any combination thereof.

In some embodiments, determining the mood vector for the virtual agent involves assigning a weight to at least one of the emotion vector for the virtual agent, the mood vector of a user for the user utterance, a mood vector for the virtual agent's last utterance. In some embodiments, the mood vector of the virtual agent is adapted to the mood vector of the user.

In some embodiments, the mood vector $M_{pad}^{Agent}$ is determined as follows (t) in EQN. 39.

$$M_{pad}^{Agent}(t) = \qquad \text{EQN. 39}$$

$$\alpha E_{pad}^{Agent}(t) + \beta M_{pad}^{User}(t) + \gamma M_{pad}^{Agent}(t-1) = \begin{pmatrix} M_p^{Agent}(t) \\ M_a^{Agent}(t) \\ M_d^{Agent}(t) \end{pmatrix} =$$

-continued $$\delta \begin{pmatrix} E_p^{Agent}(t) \\ E_a^{Agent}(t) \\ E_d^{Agent}(t) \end{pmatrix} + \varepsilon \begin{pmatrix} M_p^{User}(t) \\ M_a^{User}(t) \\ M_d^{User}(t) \end{pmatrix} + \zeta \begin{pmatrix} M_p^{Agent}(t-1) \\ M_a^{Agent}(t-1) \\ M_d^{Agent}(t-1) \end{pmatrix}$$

where $E^{Agent}(t)$ is the emotion vector of the virtual agent (e.g. as described above in EQN. 38), $M^{User}(t)$ is the mood vector of the user for the user utterance, and $M^{Agent}(t-1)$ is the mood vector for the virtual agent's last utterance, t is time and p, a, and d stand for pleasure, arousal, and dominance, respectively. Coefficient $\delta$ can be set to weight the effect of the virtual agent's emotion vector (e.g., the virtual agent's emotion vector for the virtual agent's current turn) on the virtual agent's mood vector, $\varepsilon$ can be set to weight the effect of user's mood vector on the virtual agent's mood (e.g., the weight of the user's mood during the user's utterance), and $\zeta$ can be set to weight the mood vector for the virtual agent's last utterance (e.g., the mood of the virtual agent during its last turn).

The method can involve determining a personality vector for the virtual agent based on the mood vector for the virtual agent and a personality vector of a user for the user utterance (Step 630). The personality vector of the user for the user utterance can indicate a personality state of the user when the user provided the utterance. The personality vector can be expressed via a PAD model.

In various embodiments, the personality vector for the virtual agent is based on the mood vector for the virtual agent, the personality vector of a user for the user utterance, a personality vector for the virtual agent's last utterance, or any combination thereof.

In some embodiments, determining the personality vector for the virtual agent involves assigning a weight to at least one of the mood vector for the virtual agent, the personality vector of a user for the user utterance, a personality vector for the virtual agent's last utterance. In some embodiments, the personality vector of the virtual agent is adapted to the personality vector for the user.

In some embodiments, the personality vector $P_{pad}^{Agent}(t)$ is determined as follows in EQN. 40.

$$P_{pad}^{Agent}(t) = \qquad \text{EQN. 40}$$

$$\eta M_{pad}^{Agent}(t) + \theta P_{pad}^{User}(t) + \lambda P_{pad}^{Agent}(t-1) = \begin{pmatrix} P_p^{Agent}(t) \\ P_a^{Agent}(t) \\ P_d^{Agent}(t) \end{pmatrix} =$$

$$\eta \begin{pmatrix} M_p^{Agent}(t) \\ M_a^{Agent}(t) \\ M_d^{Agent}(t) \end{pmatrix} + \theta \begin{pmatrix} P_p^{User}(t) \\ P_a^{User}(t) \\ P_d^{User}(t) \end{pmatrix} + \lambda \begin{pmatrix} P_p^{Agent}(t-1) \\ P_a^{Agent}(t-1) \\ P_d^{Agent}(t-1) \end{pmatrix}$$

where $M^{Agent}(t)$ is the mood vector of the virtual agent (e.g. as described above in EQN. 2), $P^{User}(t)$ is the personality vector of the user for the user utterance, and $P^{Agent}(t-1)$ is the personality vector for the virtual agent's last utterance, t is time and p, a, and d stand for pleasure, arousal, and dominance, respectively. Coefficient $\eta$ can be set to weight the effect of the virtual agent's mood vector (e.g., the virtual agent's mood vector for the virtual agent's current turn) on the virtual agent's personality vector, $\theta$ can be set to weight the effect of user's personality vector on the virtual agent's personality (e.g., the weight of the user's personality during the user's utterance), and $\lambda$ can be set to weight the personality vector for the virtual agent's last utterance (e.g., the personality of the virtual agent during its last turn).

In some embodiments, $\lambda$ is selected to be larger than $\eta$ such that the virtual agent's previous personality vector affects the virtual agent's current personality vector more than the virtual agent's mood.

In some scenarios, $\lambda$ is set to be large in comparison to $\eta$ and $\theta$ such that, for example, the virtual agent's personality is substantially static (e.g., always positive, extrovert, agreeable, and/or open to change). In some scenarios, $\lambda$ is set to be small in comparison to $\eta$ and $\theta$ such that, for example, the virtual agent's personality is adaptable (e.g., this can be desirable in helping applications).

The method can involve determining at least one of a facial expression, body gesture, or vocal expression for the virtual agent based on a content of the user utterance and at least one of the emotion vector of the virtual agent, the mood vector of the virtual agent, and the personality vector of the virtual agent (Step 640).

In some embodiments, the body gestures are selected from a group of pre-determined animations (e.g., as stored in a database) based on the emotion vector of the virtual agent and/or content of the virtual agent's current utterance.

In some embodiments, the facial expressions are generated as Action Units (AUs) of a Facial Action Coding System (FACS) based on the emotion vector of the virtual agent and/or content of the virtual agent's current utterance. The AU's can be individual facial and/or head muscle movements. As the virtual agent's emotion changes dynamically (e.g., the emotion vector of the virtual agent changes), its facial expressions can change accordingly. For example, if the virtual agent's emotion vector indicates the virtual agent is happy, a happy facial expression can be generated by manipulating AU1 (inner brow raiser), AU2 (outer brow raiser), AU6 (cheek raiser), and AU12 (lip corner puller).

Intensity of each AU, e.g., intensity of each muscle movement, can be determined based on an emotion intensity of the virtual agent for the virtual agent's current utterance. The virtual agent's emotion intensity can be input by a user or determined. In some embodiments, the emotion intensity for the virtual agent can be determined based on the emotion vector for the virtual agent's current utterance. For example, as the Euclidean norm, as shown in EQN. 41, as follows:

$$|E_{PAD}^{Agent}(t)| = \sqrt{p^2 + a^2 + d^2} \qquad \text{EQN. 41}$$

where p, a, and d stand for pleasure, arousal, and dominance (e.g., the emotion vector for the virtual agent as determined above in EQN. 38). In some embodiments, emotion intensity $|E|$ is a float number in the range of [0, +1]. In these embodiments, AU intensity for each AU can be determined based on the virtual agent's emotion vector, as shown in EQN. 42 as follows:

$$|AU_i| = w_p p + w_a a + w_d d + w_e |E_{PAD}^{Agent}(t)| \qquad \text{EQN. 42}$$

where $w_p$, $w_a$, $w_d$, and $w_e$ are weights, p, a, and d, are the respective values of the emotion vector of the virtual agent. The weights $w_p$, $w_a$, $w_d$, and $w_e$ can cause a virtual agent's facial expression and/or head muscle movement intensity to display to a user an effect of the virtual agent's emotion, e.g., emotion vector pleasure, arousal, dominance, and emotion intensity. In some embodiments, for each AU, a different set of weight values are used. In various embodiments, the weights $w_p$, $w_a$, $w_d$, and $w_e$ are input by an administrative user.

The non-verbal behaviors can be based on content (e.g., single or multiple words) of an utterance of the virtual agent.

The non-verbal behaviors can be based on whether the content of the utterance of the virtual agent includes a specific dialog-act, a part of speech of the utterance of the virtual agent, domain of the utterance of the virtual agent, or any combination thereof. In various embodiments, single or multiple words of an utterance are assigned different non-verbal behaviors. In various embodiments, an entire utterance is assigned the same non-verbal behavior.

In some embodiments, the part of speech of content of the utterance of the virtual agent is determined based on using a natural language parser (e.g., Stanford NLP or others as are known in the art) to parse the utterance. The part of speech of content of the utterance can indicate if the content is a noun phrase, verb phrase, and/or theme.

In some embodiments, the type of speech of content of the utterance of the virtual agent is determined based on using a natural language parser (e.g., Stanford NLP or others as are known in the art) to parse the utterance. The type of speech of content of the utterance can indicate if the content is a noun phrase, verb phrase, and/or theme.

In some embodiments, the domain of the content of the utterance of the virtual agent is determined based on pattern matching.

In various embodiments, whether the content of the utterance includes a specific dialogue act can be determined based on pattern matching and/or data-driven deep learning approaches. Content of the utterance of the virtual agent can include dialogue acts such as negation, intensification, affirmation, assumption, question, contrast, process, quantification, comparison, response request, word search, spatial relation, physical relation, pointing, emphasis, inclusivity, interjection, greeting, obligation, punctuation, and/or confusion. Examples of word patterns in classified dialogue acts are as follow:

Intensification: really, very, quite, wonderful, great, absolutely, huge, fantastic, so, amazing, important, gorgeous, extremely, completely, or just;

Affirmation: yes, yeah, I do, I have, we have, you have, we do, it's, it is, true, ok, okey or okay;

Assumption: I guess, I suppose, I think, maybe, probably, perhaps or could;

Question: what, where, when, how, who or do;

Contrast: but, however or as opposed to;

Process: stop, continue or done;

Quantification: a lot, none, everything, every, all, some or a little;

Comparison: better, best, worst, worse or than;

Response request: you know;

Word search: urn, umm, mmm, uh, hm, hmm, uhm, well, hmmm, ummm or uhh;

Spatial relation: beyond or further;

Physical relation: longer, larger or farther;

Pointing (self, other): these, those, this, you, me, we, I, your, my, mine, yours, our, ours, their, his, her, us or theirs;

Emphasis: actively, actual, any, awful, awfully, even, ever, entirely, exact, fiendishly, frighteningly, genuinely, really, hell, indeed, interestingly, just, leastways, at least, lousy, och, perfect, seriously, strongly, sure, ultimately, guess what, serious, must, have to, has to or should;

Inclusivity: everything, all, whole, several, plenty, full or completely;

Interjection: aah, ack, agreed, ah, aha, ahem, alas, all right, amen, argh, as if, aw, ay, aye, bah, blast, boo hoo, brr, golly, bye, cheerio, cheers, chin up, come on, crikey, dear me, doggone, drat, duh, eek, egads, er, fair enough, fiddle dee dee, fiddlesticks, fie, foo, fooey, gadzooks, gah, gangway, g'day, gee, gee whiz, geez, gesundheit, get lost, get outta here, go on, good, good job, gosh, gracious, great, grr, gulp, ha, ha ha, hah, hallelujah, harrumph, haw, hee, here, hey, hmm, ho hum, hoo, hooray, how, huh, hum, humbug, hurray, huzza, I say, ick, ixnay, jeez, just kidding, just a sec, just wondering, kapish, la, lo, look, long time, lordy, meh, mmm, lord, god, nah, naw, never, nooo, no way, nuts, oh, oho, oh no, okay, okey dokey, om, oof, ooh, oopsey, over, oy, oyez, peace, pff, pew, phew, pish posh, psst, ptui, quite, rah, rats, ready, right, right on, roger, roger that, rumble, say, see ya, shame, shh, shoo, shucks, sigh, sleep tight, snap, sorry, sssh, sup, ta, tada, ta ta, take that, tally ho, tch, thanks, there there, time out, toodles, touche, tsk, tut, ugh, uh, urn, ur, urgh, very nice, very well, voila, vroom, wah, well, well done, whatever, whee, whoa, whoo, whoopee, whoops, whoopsey, whew, wow, wuzzup, ya, yea, yeah, yech, yikes, yippee, yo, yoo hoo, you bet, you know, yow, yum, yummy, zap, zounds, zowie or zzz;

Greeting: hey, hi, how's it going?, how is it going?, how are you?, how are you doing?, what's up?, what's new?, what's going on?, how's everything?, how is everything?, how are things?, how's life?, how's your day?, how's your day going?, good to see you, nice to see you, long time no see, it's been a while, good morning, good afternoon, good evening, it's nice to meet you, pleased to meet you, how have you been?, how do you do?, yo, are you OK?, you alright?, alright mate?, howdy, Sup?, Whazzup?, g'day, hiya!, bye, goodbye, farewell, have a good day, take care, bye bye, later!, see you later, talk to you later, have a good one, so long, all right then, catch you later, peace, peace out, I'm out, adios, ciao, au revior or sayonara;

Obligation: must, have to, has to, should or ought to;

Punctuation: ? or !;

Confusion: I am confused, I'm confused, I don't understand, I don't know, I do not know, I do not understand, I have no idea or I've no idea;

Negation: not at all, of course not, not, never or no.

The following are examples of non-verbal behaviors that can be generated, and one or more rules that can be used for determining the non-verbal behaviors:

Blink: A non-verbal behavior for the virtual agent can be a blink gesture, e.g., AU46, for random words of the virtual agent's utterance.

Gaze: A non-verbal behavior for the virtual agent can be of a gaze gesture (e.g., gaze of a virtual agent away from user or towards user). The gaze of the virtual agent can change while the virtual agent is speaking. The gaze of the virtual agent can be based on one or more rules. For example, the one or more rules as follows:

Rule 1: if the virtual agent is uttering a theme part of a sentence (e.g., part of a clause which creates a coherent link with a preceding clause), in the beginning of the virtual agent's speaking turn, set the virtual agent's gaze to look away from the user.

Rule 2: if the virtual agent is uttering the theme part of a sentence, not in the beginning of the virtual agent's speaking turn, set the virtual agent's gaze to look away from the user randomly with a 70% chance (e.g., 70 out of 100 themes uttered by the virtual agent are uttered while the virtual agent is looking away from the user).

Rule 3: if the virtual agent is uttering a theme part of a sentence (e.g., part of a clause that contributes some new information to the discussion), at the end of the virtual agent's speaking turn, set the virtual agent's gaze to look towards the user (e.g., set the virtual agent's gaze to look towards the user at the end of every virtual agent utterance).

Rule 4: if the virtual agent is uttering the theme part of a sentence, not at the end of the virtual agent's speaking turn, set the virtual agent's gaze to look towards the user randomly with a 73% chance (e.g., 73 out of 100 themes uttered by the virtual agent are uttered while agent is looking towards the user).

Rule 5: if the virtual agent is uttering a phrase with an inclusivity dialog act (e.g., everything, all, or whole), set the virtual agent's gaze to look away from the user.

Rule 6: if the virtual agent is uttering a phrase with an interjection dialog act (e.g., yeah or uh), set the virtual agent's gaze to look away from the user.

Rule 7: if the virtual agent is uttering a phrase with a word-search dialog act (e.g., mmm or well), set the virtual agent's gaze to look away from the user.

Rule 8: if the virtual agent is uttering a phrase with a pointing dialog act (e.g., this, you, or me), set the virtual agent's gaze to look away from the user.

Rule 9: if the virtual agent is uttering a noun phrase, set the virtual agent's gaze to look away from the user at a start of the noun phrase.

Rule 10: if the virtual agent is uttering a verb phrase, set the virtual agent's gaze to look away from the user at a start of the verb phrase.

Brow movement: A non-verbal behavior for the virtual agent can be eyebrow movement(s) (e.g., raise and/or frown). The eyebrow movements for the virtual agent can be based on one or more rules. For example, one or more as follows:

Rule 1: if the virtual agent is uttering a phrase/sentence containing a negation dialog act (e.g., not or never), set the virtual agent's eyebrow movement to show frown brows to the user during the phrase/sentence.

Rule 2: if the virtual agent is uttering an intensification word/phrase (e.g., very or totally), set the virtual agent's eyebrow movement to show frown brows to the user during the word/phrase.

Rule 3: if the virtual agent is uttering a phrase/sentence containing an affirmation dialog act (e.g., Ok or true), set the virtual agent's eyebrow movement to show raised brows to the user during the phrase/sentence.

Rule 4: if the virtual agent is uttering an assumption word/phrase (e.g., I guess), set the virtual agent's eyebrow movement to show frown brows to the user during the word/phrase.

Rule 5: if the virtual agent is uttering a question word/phrase (e.g., what or where), set the virtual agent's eyebrow movement to show raised brows to the user during the word/phrase.

Rule 6: if the virtual agent is uttering a contrast word/phrase (e.g., but or however), set the virtual agent's eyebrow movement to show raised brows to the user during the word/phrase.

Rule 7: if the virtual agent is uttering a phrase/sentence containing a quantification dialog act (e.g., all or some), set the virtual agent's eyebrow movement to show raised brows to the user during the phrase/sentence.

Rule 8: if the virtual agent is uttering a response request word/phrase (e.g., you know), set the virtual agent's eyebrow movement to show raised brows to the user during the word/phrase.

Rule 9: if the virtual agent is uttering a word search word/phrase (e.g., mmm or well), set the virtual agent's eyebrow movement to show raised brows to the user during the word/phrase.

Rule 10: if the virtual agent is uttering an inclusivity word/phrase (e.g., everything or whole), set the virtual agent's eyebrow movement to show raised brows to the user during the word/phrase.

Rule 11: if the virtual agent is uttering a greeting word/phrase (e.g., hi or good morning), set the virtual agent's eyebrow movement to show raised brows to the user during the word/phrase.

Rule 12: if the virtual agent is uttering a domain-dependent word/phrase object (e.g., football in sports domain), set the virtual agent's eyebrow movement to show raised brows to the user during the object word/phrase.

Smile: A non-verbal behavior for the virtual agent can be a smile and/or a smile with intensity. The smile and/or smile with the intensity can be based on one or more rules. For example, one or more as follows:

Rule 1: if the virtual agent is uttering a phrase/sentence containing an affirmation dialog act (e.g., Ok or true), set the virtual agent to show a smile to the user during the phrase/sentence.

Rule 2: if the virtual agent is uttering a phrase/sentence containing a greeting dialog act (e.g., hi or good morning), set the virtual agent to show a smile to the user during the phrase (or sentence).

Head Nod: A non-verbal behavior for the virtual agent can be head nods. The head nods can be generated based on one or more rules. For example, one or more rules as follows:

Rule 1: if the virtual agent is uttering an intensification word/phrase (e.g., very, totally), set the virtual agent to show a head nod to the user during the word/phrase.

Rule 2: if the virtual agent is uttering a phrase/sentence containing an affirmation dialog act (e.g., Ok or true), set the virtual agent to show a head nod to the user during the phrase/sentence.

Rule 3: if the virtual agent is uttering a phrase/sentence containing an assumption dialog act (e.g., I guess), set the virtual agent to show a big head nod to the user during the phrase/sentence.

Rule 4: if the virtual agent is uttering an emphasis word/phrase (e.g., exact or really), set the virtual agent to show a small head nod to the user during the word/phrase.

Rule 5: if the virtual agent is uttering an interjection word/phrase (e.g., yeah or uh), set the virtual agent to show a head nod to the user during the word/phrase.

Rule 6: if the virtual agent is uttering the first noun phrase of a sentence, set the virtual agent to show a big head nod to the user at the beginning of the noun phrase.

Head Shake: A non-verbal behavior for the virtual agent can be head shakes. The head shakes can be generated based on one or more rules. For example, one or more rules as follows:

Rule 1: if the virtual agent is uttering a phrase/sentence containing a negation dialog act (e.g., not or never), set the virtual agent to show a head shake to the user during the phrase/sentence.

Rule 2: if the virtual agent is uttering an intensification word/phrase (e.g., very, totally), set the virtual agent to show a head shake to the user during the word/phrase.

Rule 3: if agent is uttering an inclusivity word/phrase (e.g., everything, whole), show a head shake on that word/phrase.

Rule 4: if agent is uttering an interjection word/phrase (e.g., yeah, uh), show a head shake on that word/phrase.

Head Sweep: A non-verbal behavior for the virtual agent can be head sweeps. The head sweeps can be generated based one or more rules. The one or more rules can be as follows:

Rule 1: if the virtual agent is uttering an intensification word/phrase (e.g., very, totally), show a head sweep on that word/phrase.

Rule 2: if the virtual agent is uttering a phrase containing a listing dialog act (e.g., and, or), set the virtual agent to show a head sweep to the user during the phrase.
Rule 3: if the virtual agent is uttering a quantification word/phrase (e.g., all or some), set the virtual agent to show a head sweep to the user during the word/phrase.
Rule 4: if the virtual agent is uttering an inclusivity word/phrase (e.g., everything, whole), set the virtual agent to show a head sweep to the user during the word/phrase.

Head Movement: A non-verbal behavior for the virtual agent can be head movements (e.g., roll or tilt, yaw and/or pitch). The head movements can be generated based on one or more rules. The one or more rules can be as follows:
Rule 1: if the virtual agent is uttering a contrast word/phrase (e.g., but or however), set the virtual agent to show a head yaw randomly to the right or left to the user during the word/phrase.
Rule 2: if the virtual agent is uttering a response-request word/phrase (e.g., you know), set the virtual agent to show a head yaw randomly to the right or left to the user during the word/phrase.
Rule 3: if the virtual agent is uttering a word-search word/phrase (e.g., mmm or well), set the virtual agent to show a head tilt randomly to the right or left to the user during the word/phrase.
Rule 4: if the virtual agent is uttering an interjection word/phrase (e.g., yeah or uh), set the virtual agent to show a head tilt randomly to the right or left to the user during the word/phrase.
Rule 5: if the virtual agent is uttering a question word/phrase (e.g., what or where), set the virtual agent to show a head tilt randomly to the right or left to the user during the word/phrase.
Rule 6: if the virtual agent is uttering a pointing word/phrase (e.g., me or you), set the virtual agent to show a head tilt randomly to the right or left to the user during the word/phrase.

Hand Flick Gesture: A non-verbal behavior for the virtual agent can be hand flicks (e.g., random formless hand gestures). The hand flicks can be based on one or more rules. The one or more rules can be as follows:
Rule 1: if the virtual agent is uttering the first verb phrase of a sentence, set the virtual agent to show a hand flick to the user during the verb phrase.
Rule 2: if the virtual agent is uttering an emphasis word/phrase (e.g., exact or really), set the virtual agent to show a hand flick to the user during the word/phrase.

Iconic Hand Gesture: A non-verbal behavior for the virtual agent can be iconic hand gestures. The iconic hand gestures can be based on one or more rules. The one or more rules can be as follows:
Rule 1: if the virtual agent is uttering a domain-specific object (e.g., football in sports domain), set the virtual agent to show an iconic hand gesture generated for that object. In some embodiments, if the iconic hand gesture for the object is not available, then set the virtual agent to show a hand flick.
Rule 2: if the virtual agent is uttering a domain-specific action (e.g., pass the football in sports domain), set the virtual agent to show an iconic hand gesture generated for that action. In some embodiments, if the iconic hand gesture for the action is not available, then set the virtual agent to show a hand flick.

Hand Point Gesture: A non-verbal behavior for the virtual agent can be hand point gestures for pointing dialog acts. The hand point gesture can be based on one or more rules. For example, the one or more rules as follows:
Rule 1: if the virtual agent is uttering a point-to-self word/phrase (e.g., me or we), set the virtual agent to show a point-to-self hand gesture to the user during the word/phrase.
Rule 2: if the virtual agent is uttering a point-to-other word/phrase (e.g., you or yourself), set the virtual agent to show a point-to-other hand gesture to the user during the word/phrase.

Comparison Hand Gesture: A non-verbal behavior for the virtual agent can be comparison hand gestures (e.g., a hand flick gesture to show something is higher/lower in comparison to something else). The comparison hand gestures can be based on one or more rules. For example, the one or more rules as follows:
Rule: if the virtual agent is uttering a comparison word/phrase (e.g., better or worse), set the virtual agent to show a comparison hand gesture to the user during the word/phrase.

Contrast Body Gesture: A non-verbal behavior for the virtual agent can be contrast body gestures when the virtual agent is uttering a sentence with two contrasting phrases (e.g., on the one hand X, but on the other hand Y, the virtual agent can show a hand gesture with a one hand on the first part of the sentence, and show another hand flick gesture with the other hand when they utter the second part of the sentence).

Body Lean: A non-verbal behavior for the virtual agent can be body lean shifts randomly.

Confusion Body Gesture: A non-verbal behavior for the virtual agent can be confusion body gestures when agent is uttering a confusion phrase (e.g., I'm confused or I don't understand).

Negation Body Gesture: A non-verbal behavior for the virtual agent can be negation hand gestures (e.g., waving hand across with a palm down) and when agent is uttering a phrase/sentence containing a negation word/phrase (e.g., not or never).

Question Hand Gesture: A non-verbal behavior for the virtual agent can be question hand gestures (e.g., turning the palm from down to up) when the virtual agent is uttering a question.

Punctuation Gesture: A non-verbal behavior for the virtual agent can be special facial expressions when the virtual agent is uttering a sentence ending with a "!" or "?" punctuation. Facial expressions can include eyebrow raise and/or lip corner movements.

Idle Facial Expression: A non-verbal behavior for the virtual agent can be special facial expressions for the idle time of the virtual agent (e.g., when the virtual agent is not speaking). The idle facial expression can be generated based on the virtual agent's mood (e.g., the mood vector as determined above in EQN. 2). The idle facial expression generator can map the virtual agent's mood to its facial expressions (e.g., mapped to facial action units). The facial expression can be merged back to a subtle positive facial expression, for example, after a pre-defined amount of time (e.g., 30 seconds). Merging the virtual agent's facial expression to a positive facial expression may affect the user's emotion positively.

Process Gesture: A non-verbal behavior for the virtual agent can be a process gesture (e.g., keeping a palm up to show "stop", or an open hand gesture to show "continue") when the virtual agent is uttering a process dialog act.

Special Relation Gesture: A non-verbal behavior for the virtual agent can be a special relation gesture (e.g., wide open arm gesture with open hands to show "beyond") when the virtual agent is uttering a special relation dialog act.

Physical Relation Gesture: A non-verbal behavior for the virtual agent can be a physical relation gesture (e.g., wide high open arm gesture with open hands to show "farther") when the virtual agent is uttering a physical relation dialog act.

Obligation Gesture: A non-verbal behavior for the virtual agent can be an obligation gesture (e.g., closed arm gesture with an open hand pointing towards user to show "must" or "have to") when the virtual agent is uttering an obligation dialog act.

In some embodiments, in all of the above nonverbal behaviors, the virtual agent considers the user's personality as follows: (1) the virtual agent adapts its personality to the user's personality (e.g., as explained above), (2) if the virtual agent's extroversion score minus agent's neuroticism score is above a threshold (e.g., +1.0) the virtual agent increments the priority of each nonverbal behavior (e.g., increase the probability of showing nonverbal behaviors). In some embodiments, if the difference between the virtual agent's extroversion and neuroticism scores is below a threshold (e.g., −1.0) agent decrements the priority of each nonverbal behavior (e.g., decrease the probability of showing nonverbal behaviors). This rule can assist the virtual agent in respecting the user's personality while expressing nonverbal behaviors, because for example, some people with different personalities may like different levels of nonverbal behavior expressions.

There can be a conflict and/or redundancies in the non-verbal behavior set for the virtual agent. For example, two head or two eye movements with different directions at the same time. In another example, two hand movements that convey the same message. There may be multiple behaviors trying to move the same body/face/head part of the virtual agent in different directions (or with different intensities) at the same time. Resolving a conflict between two non-verbal behaviors can include defining priorities between the behaviors and/or determining an alternative non-verbal behavior that can convey the same meaning but that is not conflicting.

In some embodiments, prosody for the virtual agent utterance is based on an emotion vector of the virtual agent for the current utterance (e.g., as shown above in EQN. 38). Prosody can be a combination of speech parameters (e.g., speed, volume, and/or pitch). Prosody can be determined for words, phrases and/or whole sentence of the virtual agent's utterance. For example, word and/or sentence speed can be determined, for example, as follows:

$$\text{Speed}_{word} = p + 2 \times a + 2 \times d \qquad \text{EQN. 43}$$

$$\text{Speed}_{sentence} = -3 + 2 \times p + 4 \times a + 4 \times d \qquad \text{EQN. 44}$$

where p, a and d are values of the emotion vector for the virtual agent's current utterance, and the integer values can be modified based on user (e.g., administrator user) input.

In various embodiments, word speed is a float number between −2 and +1. In various embodiments, sentence speed is a float number between −5 and 0. The coefficients in EQN. 43 and 44 can vary based on the virtual agent's text-to-speech engine. Similar equations, with different coefficients, can determine the word and sentence level volume and pitch.

The method can involve applying the facial expression, body gesture, vocal expression, verbal expression or any combination thereof to the virtual agent to produce control of the virtual agent's vocal expression, body gesture, facial expression, verbal expression or any combination thereof (Step 650). Applying the facial expression body gesture, and/or vocal expression can involve generating Behavior Markup Language (BML).

The BML can specify the utterance, the prosody and/or non-verbal behaviors for the virtual agent. The BML can be used to reproduce the same behaviors using a variety of BML based virtual agent platforms. The BML can be used to determine a final set of non-verbal behaviors (e.g., as filtered by the non-verbal behavior filter as described below in FIG. 7) to generate an eXtensible Markup Language (XML) or JavaScript Object Notation (JSON) to be passed to the virtual character.

One or more attributes can be assigned to the BML of each non-verbal behavior. For example, such as time attributes (e.g., start, relax, attach peak, end), speed, amount (e.g., for intensity), repeat and/or action unit. In some embodiments, the BML is split into multiple BMLs based on a number of characters in the utterance to, for example, accommodate a virtual agent system that has a text-to-speech engine that cannot handle the entire BML together.

Content of a virtual agent's utterance can be based the emotion vector of the virtual agent for the current utterance, the mood vector of the virtual agent for the current utterance, the personality vector of the virtual agent for the current utterance (e.g., as described above in EQN. 38, 39, 40), user's dialog acts and/or user's sentence type (e.g., interrogative, declarative, or imperative). The content of the virtual agent's utterance can be positive statement, negative statement, insult, compliment, greeting, closing, appreciation, thanking, and/or apology. The content of the virtual agent's utterance can be based on one or more rules. For example, the one or more rules as follows:

Rule 1: If the user's sentence is not interrogative, the user's emotion has negative pleasure, and the user's dialog act is an insult (e.g., "You are ugly"), then the virtual agent responds to the user with an empathic insult-reply dialog act (e.g., "Sorry to hear that") in the beginning of its response.

Rule 2: If the user's sentence is not interrogative, the user's emotion has negative pleasure, and the user's dialog act is negative statement (e.g., "I am not happy with your service"), then the virtual agent responds to the user with an empathic negative-statement-reply dialog act (e.g., "I am sorry to hear that").

Rule 3: If the user's sentence is not interrogative, the user's emotion has positive pleasure, and the user's dialog act is compliment (e.g., "You look gorgeous today"), then the virtual agent responds to the user with an empathic compliment-reply dialog act (e.g., "Happy to hear that").

Rule 4: If the user's sentence is not interrogative, the user's emotion has positive pleasure, and the user's dialog act is positive statement (e.g., "It was my sister's wedding yesterday"), then the virtual agent responds to the user with an empathic positive-statement-reply dialog act (e.g., "I am happy to hear that").

Rule 5: If the user's sentence is not interrogative and the user's dialog act is greeting (e.g., "Hi"), then the virtual agent responds to the user with a personalized greeting dialog act (e.g., "Hi Alex") in the beginning of its response (the user's name is provided in the personal profile captured by the Affect Model).

Rule 6: If the user's sentence is not interrogative and the user's dialog act is closing (e.g., "Bye"), then the virtual agent responds to the user with a personalized closing dialog act (e.g., "It was nice talking to you Alex").

Rule 7: If the user's sentence is not interrogative and the user's dialog act is thanking or appreciation (e.g., "Thank you for your help"), then the virtual agent responds to the user with an empathic thanking-reply dialog act (e.g., "You are welcome").

Rule 8: If the user's sentence is not interrogative and the user's dialog act is apology (e.g., "I apologize"), then the virtual agent responds to the user with an empathic apology-reply dialog act (e.g., "It's alright") in the beginning of its response.

Rule 9: If the user's sentence is not interrogative and the user's dialog act is accept or acknowledge (e.g., "Ok, I will do that"), then the virtual agent responds to the user with an empathic thanking dialog act (e.g., "Thank you") in the beginning of its response.

Rule 10: An appropriate emotion is added to the end of the virtual agent's text, based on the virtual agent's emotion. For example, happy emotion can be mapped to a smiling or laughing emotion based on the intensity of the emotion.

In all above rules, user's formality level can also be considered when the response is being selected.

Non-verbal behavior (e.g., nod, shake, brow movements, and/or mouth movements) and/or verbal back-channel continuers (e.g., hmm, uh-huh, Ok and/or yeah) for the virtual agent can be modified as the user is speaking and/or typing an utterance (e.g., during the user's turn). The non-verbal behavior and/or verbal back-channel continuers can be based on dialogue acts of the user's utterance as the user is inputting the utterance. For example, the non-verbal behavior and/or verbal back-channel continuers can be based on one or more rules as follows:

Rule 1: if the user's utterance includes a word with affirmation, emphasis, assumption, or interjection, set the virtual agent to raise its eyebrows (e.g., AU2), express a head nod and/or randomly make a positive para-verbal sound or output a verbal back-channel continuer (e.g., uh-huh or hmm).

Rule 2: if the user's utterance includes a word with negation, set the virtual agent to lower its eyebrows (e.g., AU4) and express a head shake and/or randomly make a negative para-verbal sound or output a verbal back-channel continuer (e.g., uh-uh).

In some embodiments, the content of the virtual agent utterance and/or non-verbal behaviors are set to attempt to drive the user to a positive state.

In various embodiments, the content of the virtual agent utterance is based on a profile of the user and/or a profile of the virtual agent. The profile of the user can include first name, last name, date of birth, gender, marital status, anniversary date, city, state, country, address, phone, favorite movie, favorite food, favorite book, favorite color, likes and/or dislikes. The profile of the virtual agent can include first name, last name, date of birth, gender, marital status, anniversary date, city, state, country, address, phone, favorite movie, favorite food, favorite book, favorite color, likes and/or dislikes.

In some embodiments, the content of the virtual agent utterance includes a variable parameter such that the virtual agent utterance can adapt to the user's and/or the virtual agent's profile and/or preferences. For example, if user asks "what is your favorite food?," if the user's profile includes the user's favorite food, the virtual agent's utterance can be "I know you like ${User.FavoriteFood}, I like that too," and if the virtual agent's profile includes the virtual agent's favorite food, the virtual agent's utterance can be "I like ${Agent.FavoriteFood}", where ${x} notation shows a place holder for variable x that can be filled based on agent and/or user profiles.

In some embodiments, the virtual agent can output utterances of social-talks about the virtual agent's personal profile (e.g., responding to questions such as "what is your favorite color?"), small-talks, and personalized chit-chats (e.g., speaking about weather, food, sports). The social-talk can be based on an ensemble of rule-based and data-driven approaches to provide the responses. The rule-based chit-chat can involve pattern matching to the user utterances and can use user-agent adjacency pairs to, for example, respond to each user utterance that matches a pattern. The user-adjacency pairs pattern matching can be determined based on context-free parsers, Artificial Intelligence Markup Language (AIML), RiveScript, ChatScript and/or other approaches as are known in the art. The data-driven approach can train classifiers using historical chit-chat data (e.g., prior dialogues between users and the virtual agent), and predict the best next utterance after every user utterance.

In some embodiments, determining one or more utterances further comprises for each of the one or more utterances, determining each word of the current utterance based on previously recorded interactions. In some embodiments, determining one or more utterances further comprises, for each of the one or more utterances, selecting a single utterance from a group of utterance candidates based on a prediction of the next utterance.

In some embodiments, agent-initiated utterances can be used to handle special events. The following is an example set of special events and the corresponding actions:

Log-in: when the user logs in to the system to start a conversation, the virtual agent starts the conversation with a personalized greeting which respects the user's salutation preferences and user's formality level. Greeting is personalized using the information available in user profile, including first name, last name, title, nickname, gender, local time zone (and day-time), and formality level. For example, if user's name "John Smith" with nickname of "Johnny" and title of "Dr.," a formal log-in greeting for him would be "Nice to meet you Dr. Smith," while an informal greeting would be "Hey, Johnny!"

Log-out: when the user logs out of the system to finish a conversation, the virtual agent ends the conversation with a personalized closing statement. Closing statement is personalized using the information available in user profile, including first name, last name, title, nickname, gender, local time zone (and day-time), and formality level.

Birthday: if the user's birthday (e.g., as known from user profile) occurred less than one week or will be in the next week, the virtual agent provides a personalized birthday congratulations and wishes in the beginning of the conversation. The virtual agent can keep track of the last birthday congratulation, so repeated congratulations are prevented.

Anniversary: if the user's anniversary date (known from user profile) occurred less than one week or will be in the next week, the virtual agent can provide personalized anniversary congratulations and wishes in the beginning of the conversation. The virtual agent can keep track of the last anniversary congratulation, so repeated congratulations are prevented.

Holiday: if the conversation date is a local holiday in the user's location, the virtual agent can wish the user a happy holiday and can keep track of the last holiday wishes to prevent repeated congratulations.

Idle: when the user is idle and is not actively interacting with the virtual agent (i.e., not speaking for more than a pre-defined amount of time), the virtual agent tries to re-activate the conversation by bringing up a topic which is of the user's interest (personalized social talk). The virtual agent uses available weather and news highlight web-services (e.g., World Weather Online API, New York Times API) to provide social talks about the user's local weather forecast and news highlights related to user's interests and likes. User location information (i.e., city, state, country) and interests are retrieved from user profile. Other idle event handlers can be added to this event handler to make the idle time social talks more diverse.

Last log-in time: when a new conversation is started, the virtual agent can remind the user about the topic or summary of the previous conversation they had. This can make a personalized empathic start for the conversation and/or improve the likeability of the virtual agent.

In some embodiments, a portion of the utterance of the virtual agent that is based on an emotional state of the user and/or agent can be conflicting with utterances received from one or more dialogue managers of the virtual agent. For example, a virtual agent may use different dialog managers for fulfilling different goals and/or managing different types of dialogs (e.g., goal-oriented, domain-dependent, free-domain and/or chit-chat). In some scenarios, multiple dialog managers can provide responses to a user utterance that need to be concatenated (e.g., if dialog managers work in parallel). In such cases, there can be a possibility of confliction or duplication in the conjugation of the responses. The following example shows confliction and duplication cases:
1. User: I need to pay my invoice.
2. Virtual Agent: No need to worry. What is your invoice ID?
3. User: My invoice id is 123456.
4. Virtual Agent: Thanks. What is your invoice date?
5. User: You are ugly.
6. Virtual Agent: I am sorry to hear that. Thanks. What is your invoice date?
7. User: You are pretty.
8. Virtual Agent: Thank you. Thanks. What is your invoice date?

In the example above, in line 6, the portion of the agent utterance that is based on the emotional state provides the "I am sorry to hear that" response to the user utterance "You are ugly". At the same time another dialog manager which was taking care of the invoice payment still needs the invoice date, so keeps asking about the invoice date with the previous utterance "Thanks. What is your invoice date?" Therefore, a conflict happens between "I am sorry to hear that" and "Thanks". The conflict can be resolved by finding a most appropriate answer, and filtering out the wrong answer. The filtered answer in this example can be "I am sorry to hear that. What is your invoice date?"

In the example above in line 8, the portion of the agent utterance that is based on the emotional state provides the "Thank you" response to the user utterance "You are pretty". At the same time another dialog manager which was taking care of the invoice payment still needs the invoice date, so keeps asking about the invoice date with the previous utterance "Thanks. What is your invoice date?" Therefore, duplication happens between "Thank you" and "Thanks". The conflict can be resolved by finding an appropriate answer (if applicable), and resolving the duplication. The filtered answer in this example can be "Thank you. What is your invoice date?"

Conflicts and/or duplicates can be recognized based on sentence sentiment (e.g., negative, neutral or positive), sentence type (e.g., interrogative, imperative, or declarative), and/or dialog acts (e.g., greeting, closing, thanking, thanking-reply, reject, apology, apology-reply, accept, well-wishing, acknowledge, not-understanding, insult and/or compliment).

In some embodiments, an utterance of the virtual agent can be modified to, for example, improve believability of the virtual agent, likability of the virtual agent and/or user engagement. The virtual agent can provide similar responses in different phrases. For example, "may I have", "can I have", "may I get", "can I get" can be randomly replaced as they are paraphrases. Pattern matching can be used to find paraphrasing opportunities in a sentence and/or replace matched parts of the sentence with their corresponding paraphrases randomly. For example, sentence "I understand, may I have your invoice ID?" can become "I see, can I get your invoice ID?", if phrase "I understand," is paraphrased with "I see," and phrase "may I have" is the paraphrased with "can I get." In some embodiments, if multiple phrases are available a random option can be selected to, for example, increase variability of the virtual agent's response.

In some embodiments, a user can input unstructured information queries. For example, regular daily chit-chat conversations between humans can require some general knowledge (e.g., knowledge having to do with the world). For example, "where is the capital of France?" or "what is 2 to the power of 5?" In these embodiments, the virtual agent can have a dialogue with a user that utters unstructured statements. The virtual agent can query a third-party unstructured information management system (e.g., Wolfram Alpha or others as are known in the art). A virtual agent that has both the unstructured information manager module and can base its response on an emotional state provides a unique experience for the user, as it can deliver a positive confidence feeling to the user, that the intelligent virtual agent has enough knowledge about the outside world.

Figure 7:
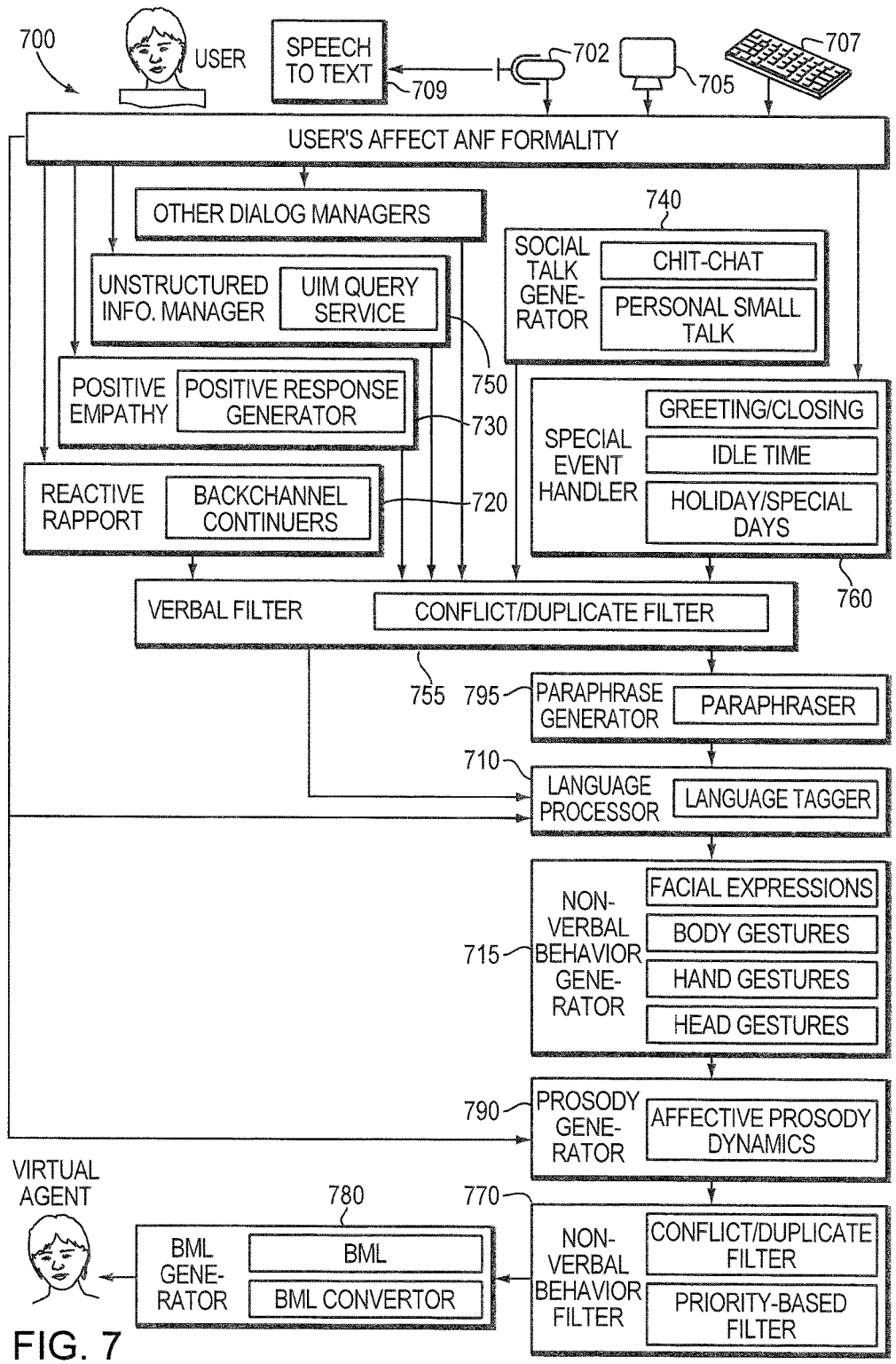
FIG. 7 is a diagram of system architecture for automatically generating at least one of facial expressions, body gestures, vocal expressions or verbal expressions for a virtual agent, according to an illustrative embodiment of the invention.

FIG. 7 is a diagram of a system 700 architecture for automatically generating at least one of facial expressions, body gestures, vocal expressions, or verbal expressions for a virtual agent, according to an illustrative embodiment of the invention. The system 700 can include a language processor module 710, a non-verbal behavior generator 715, a reactive rapport module 720, a positive empathy module 730, a social talk generator module 740, an unstructured information manager module 750, a special event handler module 760, a verbal filter module 755, a prosody generator 790, a non-verbal behavior filter 770, a BML generator 780 and/or a paraphrase generator module 795, or any combination thereof.

The system 700 can have speech input from a user (e.g., via a microphone 702), facial expressions from a user (e.g., via camera 705) and/or text input (e.g., via keyboard 707 or speech to text converter 709). The system 700 can also have input of affect of a user and/or formality of a user. Affect of the user can be described as emotion, mood and/or personality of the user, and expressed via vectors in a PAD model (e.g., as described above in FIG. 1). In some embodiments, the emotion vector of the user, the mood vector of the user and/or the personality vector of the user, as determined above with respect to FIG. 1 are the affect inputs to the system 700. In various embodiments, the emotion vector of the user, the mood vector of the user and/or the personality vector of the user is input via a system administrator, pulled from a database and/or received from another system. In some embodiments, the formality of the user is the formality as determined above with respect to FIG. 1. In some embodiments, the formality is input via system administrator, pulled form a database and/or received from another system.

The reactive rapport module 720 can take as input a user's utterance, an emotion vector of the user, mood vector of the user, and/or personality vector of the user (e.g., as described above in FIG. 6). The reactive rapport module 720 can determine an emotion vector, a mood vector and/or a personality vector for the virtual agent based on the input. The reactive rapport module 720 can also determine any backchannel continuers for the output for the virtual agent utterance.

The positive empathy module 730 can take as input the emotion vector of the user, the mood vector of the user, the personality vector of the user, user dialog acts, and/or user sentence types. The positive empathy module 730 can output a verbal reaction for the virtual agent utterance having a positive empathy to the user (e.g., as described above with respect to FIG. 6). This module can respect the user's formality, by, for example, selecting verbal expressions that match the user's formality. For example, as a response to a user's thanking (e.g., "thank you"), a formal response from virtual agent can be "It was my pleasure," while an informal response can be "anytime."

The social talk generator module 740 can take as input the user utterance. The social talk generator module 740 can output a social conversation utterance for the virtual agent utterance (e.g., as described above with respect to FIG. 6).

The unstructured information manager module 750 can take as input the user utterance. The unstructured information manager module 750 can output information for the virtual agent utterance (e.g., as described above with respect to FIG. 6).

The special event handler module 760 can take as input events within the system (e.g., log-in or log-out). The special event handler module 760 can output an empathetic and/or personalized response for the virtual agent utterance (e.g., as described above with respect to FIG. 1).

The verbal filter module 755 can receive output for the virtual agent utterance from the positive empathy module 730, the social talk generator module 730, the unstructured information manager module 750, the special event handler module 760 and/or other dialogue mangers as are in the system 765, which can be a combination of one or more dialogue managers that can provide virtual agent utterances to respond to the user utterance. The verbal filter module 755 can filter the outputs for the virtual agent utterance to resolve conflicts and/or duplication in the output (e.g., as described above with respect to FIG. 6) to produce a filtered output for the virtual agent utterance.

The paraphrase generator module 795 can receive the filtered output for the virtual agent utterance from the verbal filter module, and determine whether to modify the output for the virtual agent utterance (e.g., as described above with respect to FIG. 6). The paraphrase generator module 795 can output a final output for the virtual agent utterance.

The language processor module 710 can receive as input the final output for the virtual agent utterance from the paraphrase generator module 795, the user utterance, the emotion vector, mood vector, and/or personality vector of the virtual agent from the reactive rapport module 770.

The language processor module 710 can annotate words, phrases or the entire utterance of the virtual agents utterance based on whether the words, phrases or the entire utterance is a dialogue act, type of speech, and/or domain (e.g., as described above with respect to FIG. 6). The output of the language processor module 710 can include an annotated utterance for the virtual agent.

The non-verbal behavior generator module 715 can take as input the annotated utterance for the virtual agent from the language processor module 710. The non-verbal behavior generator module 715 can generate facial expressions, body gestures, hand gestures and/or head gestures for the virtual agent based on the annotated utterance (e.g., as described above in FIG. 6). The non-verbal behavior generator module 715 can output the non-verbal behavior for the virtual agent and/or the final output for the virtual agent utterance.

The prosody generator module 790 can take as input the non-verbal behavior for the virtual agent and/or the final output for the virtual agent utterance from the non-verbal behavior generator module 715. The prosody generator can determine prosody for the final output for the virtual agent utterance based on an emotional state of the virtual agent (e.g., as described above in FIG. 6).

The non-verbal behavior filter module 770 can take as input the final output for the virtual agent utterance with prosody and the non-verbal behavior for the virtual agent from the prosody generator module 790. The non-verbal behavior filter module 770 can filter non-verbal behavior for conflicts and/or redundancies (e.g., as described above in FIG. 6). The non-verbal behavior filter module 770 can output a final non-verbal behavior and the final output for the virtual agent utterance with prosody.

The BML generator module 780 can take as input the final non-verbal behavior and the final output for the virtual agent utterance with prosody from the non-verbal behavior filter module 770. The BML generator module 780 can generate a BML for the virtual agent based on its input.

As described above with respect to FIG. 6 and FIG. 7, the virtual agent's output can be modified based on the emotional state of the virtual agent and the user. The output can be based on an emotion vector of a user, a mood vector of the user and/or a personality vector of the user. The emotion vector of the user, mood vector of the user and/or personality vector of the user can be based on an emotion, mood and/or personality of the user.

Figure 8A:
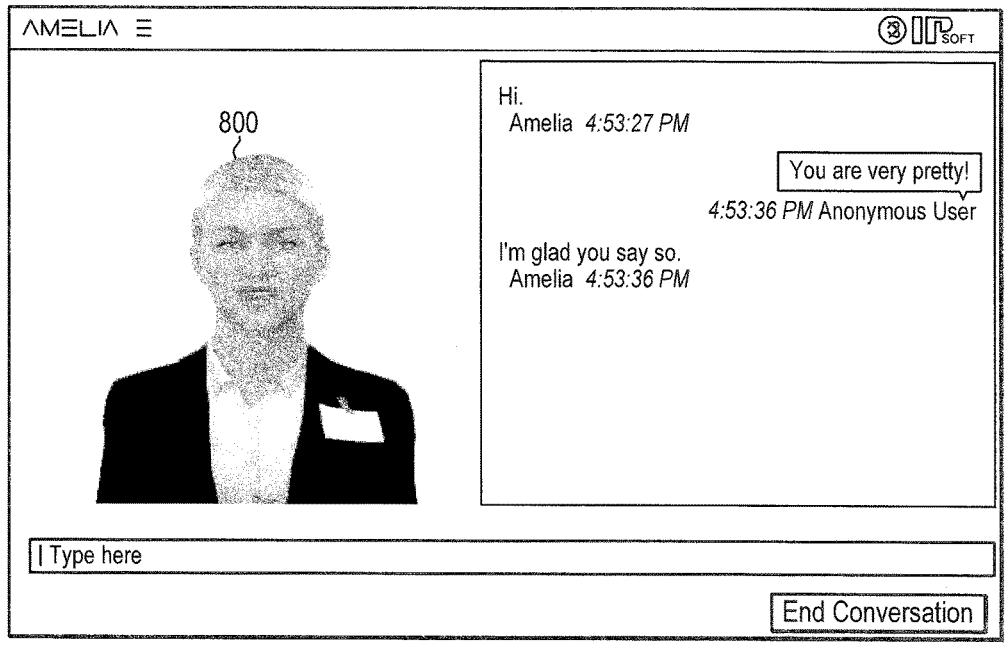
FIGS. 8A-8D are examples of user interfaces showing a virtual agent behavioral output for the same user utterance that is based on an emotion vector, mood vector and/or personality vector of a user, according to illustrative embodiments of the invention.
Figure 8B:
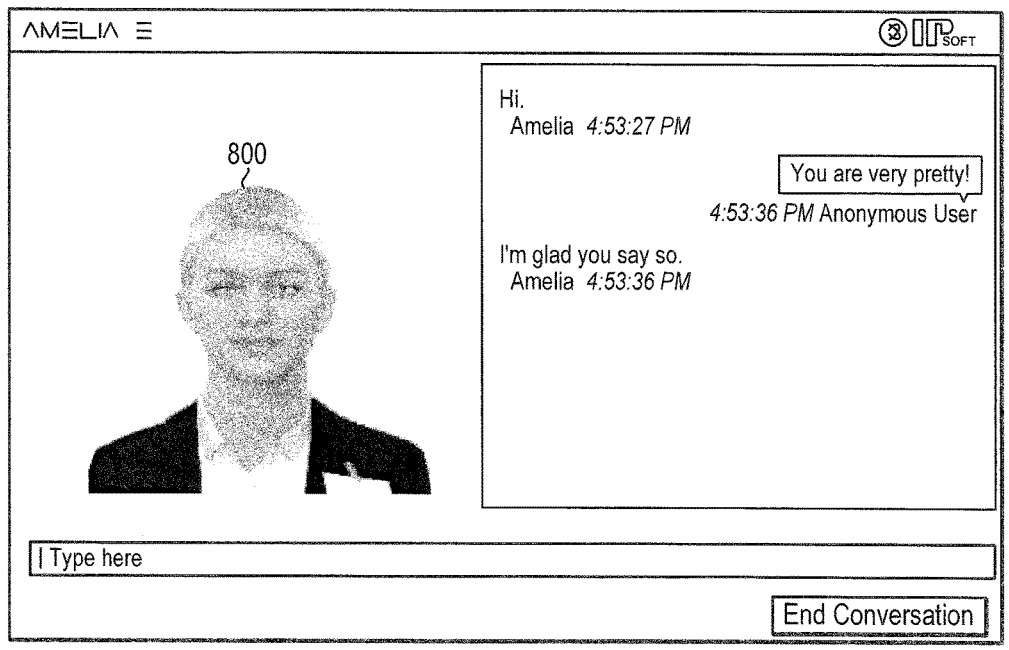
Figure 8C:
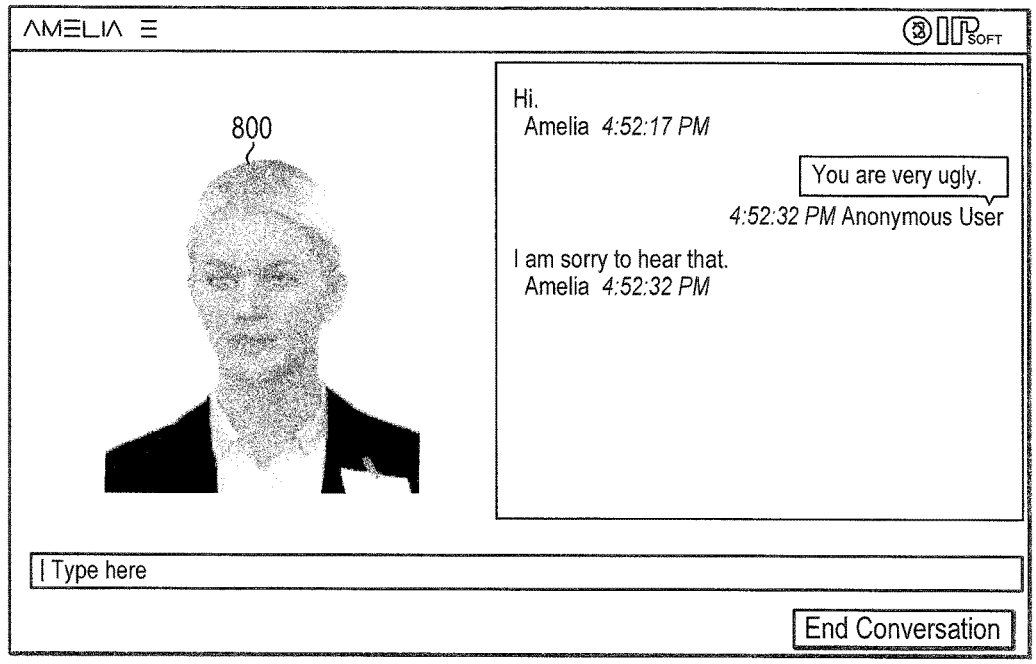
Figure 8D:
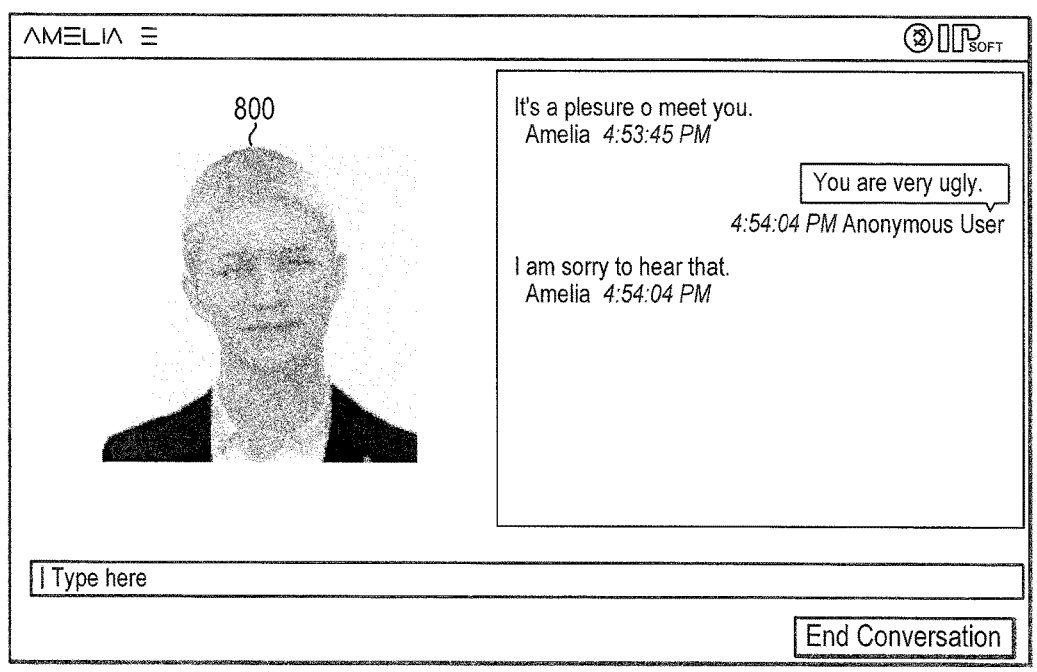
Figure 9:
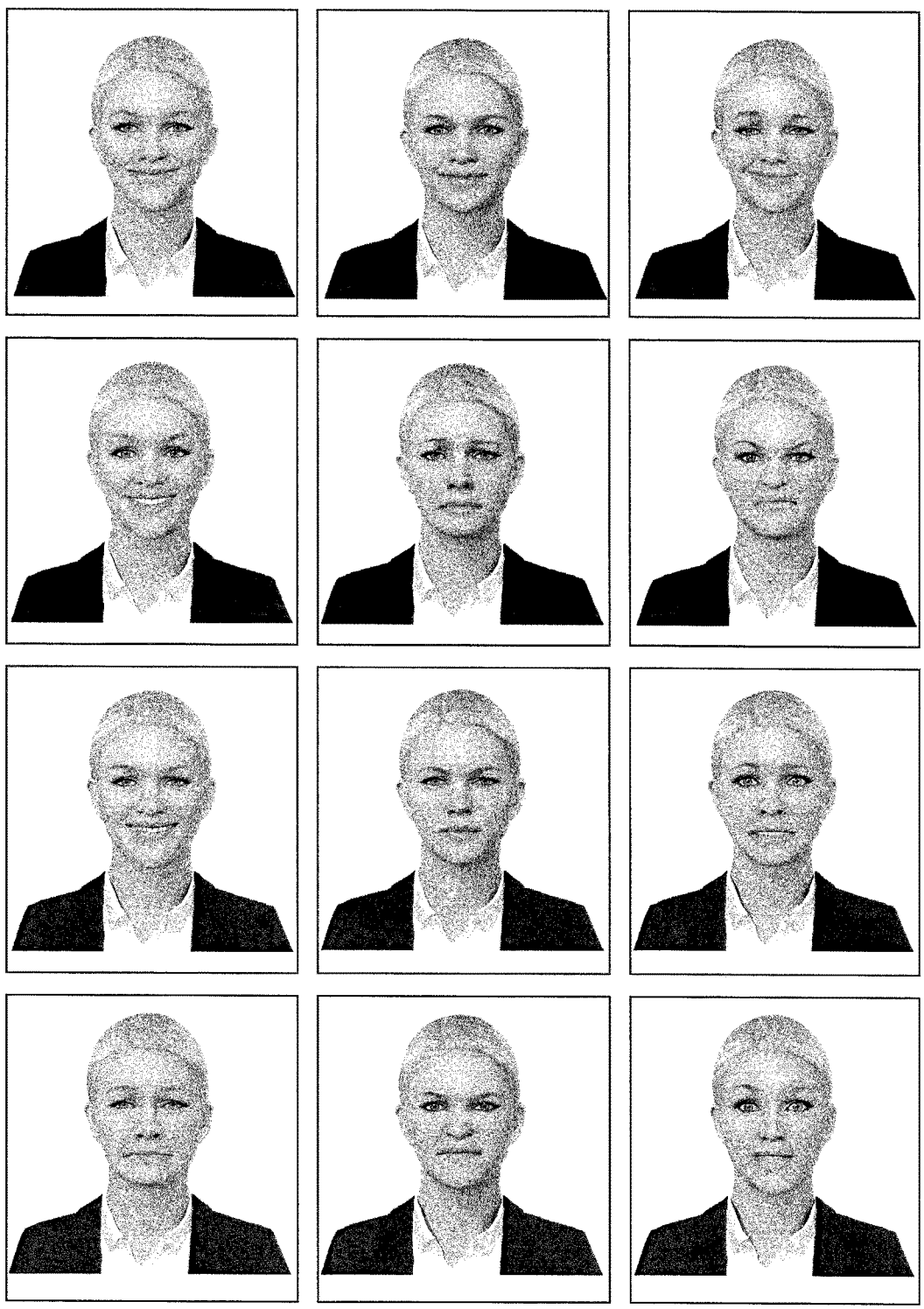
FIG. 9 shows examples of a virtual agent having various behavioral outputs, according to an illustrative embodiment of the invention.

FIGS. 8A-8D are examples of user interfaces showing a virtual agent behavioral output for the same user utterance that is based on an emotion vector, mood vector and/or personality vector of a user, according to illustrative embodiments of the invention. FIG. 8A and FIG. 8B show a virtual agent 800 with two different behavioural output for the same conversation. FIG. 8C and FIG. 8D show the virtual agent 800 with two different behavioural output for the same conversation FIG. 9 shows examples of a virtual agent having various behavioral output, according to an illustrative embodiment of the invention. As can be seen in FIG. 9, behavioral expression of the virtual agent can change. As described above, the behavioral expressions of the virtual agent can change based on user and/or virtual agent's emotion, mood and/or personality.

Figure 10:
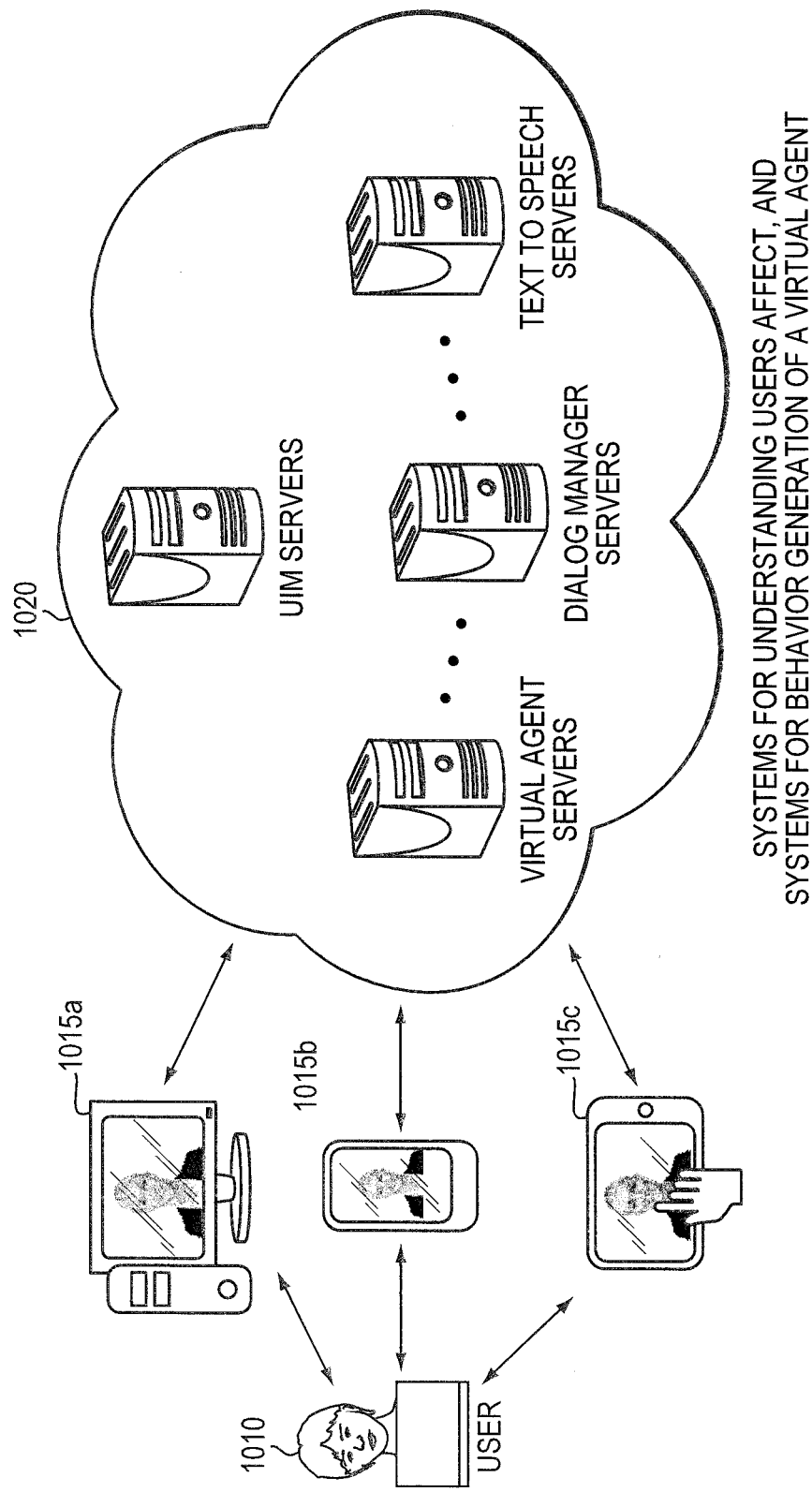
FIG. 10 is a diagram of a system for a virtual agent in accordance with an illustrative embodiment of the invention.

FIG. 10 is a diagram of a system for a virtual agent in accordance with an illustrative embodiment of the invention. A user 1010 can use a computer 1015*a*, a smart phone 1015*b* and/or a tablet 1015*c* to communicate with a virtual agent. The virtual agent can be implemented via system 1020. The system 1020 can include virtual agent servers, UIM servers, dialogue management services and/or text to speech servers. Each server in the system 1020 can be implement on one computing device or multiple computing devices. As is apparent to one of ordinary skill in the art, the system 1020 is for example purposes only and that other server configurations can be used (e.g., the virtual agent server and the dialogue manager server can be combined).

The above-described methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "determining," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for automatically generating at least one of facial expressions, body gestures, vocal expressions, or verbal expressions for a virtual agent, the method comprising:
   receiving, by a computer, an emotion vector for a user, a mood vector for the user, and a personality vector of the user, wherein the emotion vector for the user, the mood vector for the user and the personality vector of the user are all for a particular utterance of the user;
   determining, by a computer, an emotion vector for the virtual agent based on the emotion vector of the user;
   determining, by the computer, a mood vector for the virtual agent based on i) the emotion vector for the virtual agent, and ii) the mood vector of the user;
   determining, by the computer, a personality vector for the virtual agent based on i) the mood vector for the virtual agent, and ii) a personality vector of the user;
   determining, by the computer, at least one of a facial expression, body gesture, vocal expression, or verbal expression for the virtual agent based on a content of the particular user utterance and at least one of the emotion vector for the virtual agent, the mood vector for the virtual agent and the personality vector for the virtual agent; and
   applying, by the computer, the facial expression, body gesture, vocal expression, verbal expression, or any combination thereof to the virtual agent to produce control of the virtual agent's vocal expression, facial expression or both.

2. The method of claim 1 wherein the emotion vector, mood vector, and the personality vector are expressed as a pleasure, arousal, and dominance model.

3. The method of claim 1 wherein applying the facial expression, body gesture, vocal expression, verbal expression or any combination thereof to the virtual agent further comprise outputting by the virtual agent a virtual agent utterance.

4. The method of claim 1 wherein applying the facial expression body gesture, vocal expression, verbal expressions, or any combination thereof further comprises generating behavior markup language.

5. The method of claim 1 further comprising determining, by the computer, one or more utterances for the virtual agent based on the content of the particular user utterance and at least one of the emotion vector for the virtual agent, the mood vector for the virtual agent and the personality vector for the virtual agent.

6. The method of claim 5 wherein determining one or more utterances is further based on a profile of the user.

7. The method of claim 5 wherein determining one or more utterances further comprises for each of the one or more utterances, determining each word of the current utterance based on previously recorded interactions.

8. The method of claim 5 wherein determining one or more utterances further comprises for each of the one or more utterances, selecting a single utterance from a group of utterance candidates based on a prediction of the next utterance.

9. The method of claim 1 wherein determining an emotion vector for the virtual agent is further based on an emotion vector of the virtual agent for a current utterance of the virtual agent, and an emotion vector for the virtual agent's last utterance.

10. The method of claim 9 wherein determining the emotion vector for the virtual agent further comprises assigning, by the computer, a weight to at least one of i) the emotion vector of the user, ii) the emotion vector of the virtual agent for a current utterance of the virtual agent, and iii) the emotion vector for the virtual agent's last utterance, based on a type of the virtual agent, an administrative user input, or any combination thereof.

11. The method of claim 1 wherein determining a mood vector for the virtual agent is further based a mood vector for the virtual agent's last utterance.

12. The method of claim 11 wherein determining a mood vector for the virtual agent further comprises assigning a weight to at least one of i) the emotion vector for the virtual agent, ii) the mood vector of the user, and iii) the mood vector for the virtual agent's last utterance, based on a type of the virtual agent, an administrative user input, or combination thereof.

13. The method of claim 1 wherein determining a personality vector for the virtual agent is further based on a personality vector for the virtual agent's last utterance.

14. The method of claim 13 wherein determining a personality vector for the virtual agent further comprises assigning, by the computer, a weight to at least one of i) mood vector for the virtual agent, ii) the personality vector of the user, and iii) the personality vector for the virtual agent's last utterance based on a type of the virtual agent, an administrative user input, or combination thereof.

15. The method of claim 1 wherein determining a facial expression, body gesture, vocal expression, or verbal expression for the virtual agent is further based on content of an utterance of the virtual agent.

16. An article comprising a non-transitory computer readable storage medium containing program instructions for causing a computer to perform a method for automatically generating at least one of facial expressions, body gestures, vocal expressions, or verbal expressions for a virtual agent, the method comprising:

receive an emotion vector for a user, a mood vector for the user, and a personality vector of the user, wherein the emotion vector for the user, the mood vector for the user and the personality vector of the user are all for a particular utterance of the user;

determine an emotion vector for the virtual agent based on the emotion vector of the user;

determine a mood vector for the virtual agent based on i) the emotion vector for the virtual agent, and ii) the mood vector of the user;

determine a personality vector for the virtual agent based on i) the mood vector for the virtual agent, and ii) a personality vector of the user;

determine at least one of a facial expression, body gesture, vocal expression, or verbal expression for the virtual agent based on a content of the particular user utterance and at least one of the emotion vector for the virtual agent, the mood vector for the virtual agent and the personality vector for the virtual agent; and apply the facial expression, body gesture, vocal expression, verbal expression, or any combination thereof to the virtual agent to produce control of the virtual agent's vocal expression, facial expression or both.

17. An apparatus comprising:

a processor configured to:

receive an emotion vector for a user, a mood vector for the user, and a personality vector of the user, wherein the emotion vector for the user, the mood vector for the user and the personality vector of the user are all for a particular utterance of the user;

determine an emotion vector for the virtual agent based on the emotion vector of the user;

determine a mood vector for the virtual agent based on i) the emotion vector for the virtual agent, and ii) the mood vector of the user;

determine a personality vector for the virtual agent based on i) the mood vector for the virtual agent, and ii) a personality vector of the user;

determine at least one of a facial expression, body gesture, vocal expression, or verbal expression for the virtual agent based on a content of the particular user utterance and at least one of the emotion vector for the virtual agent, the mood vector for the virtual agent and the personality vector for the virtual agent; and apply the facial expression, body gesture, vocal expression, verbal expression, or any combination thereof to the virtual agent to produce control of the virtual agent's vocal expression, facial expression or both.

* * * * *